(12) United States Patent
Richter

(10) Patent No.: US 12,346,409 B1
(45) Date of Patent: Jul. 1, 2025

(54) METHOD AND DEVICE FOR PRESENTING CONTENT BASED ON ENVIRONMENT TYPE

(71) Applicant: Apple Inc., Cupertino, CA (US)

(72) Inventor: Ian M. Richter, Los Angeles, CA (US)

(73) Assignee: Apple Inc., Cupertino, CA (US)

( * ) Notice: Subject to any disclaimer, the term of this patent is extended or adjusted under 35 U.S.C. 154(b) by 375 days.

(21) Appl. No.: 17/506,879

(22) Filed: Oct. 21, 2021

Related U.S. Application Data

(60) Provisional application No. 63/111,885, filed on Nov. 10, 2020.

(51) Int. Cl.
| | |
|---|---|
| *G06N 3/04* | (2023.01) |
| *G06F 18/2413* | (2023.01) |
| *G06F 18/2431* | (2023.01) |
| *G06V 10/60* | (2022.01) |
| *G06V 20/50* | (2022.01) |

(52) U.S. Cl.
CPC ...... *G06F 18/2413* (2023.01); *G06F 18/2431* (2023.01); *G06N 3/04* (2013.01); *G06V 10/60* (2022.01); *G06V 20/50* (2022.01)

(58) Field of Classification Search
CPC . G06F 18/2413; G06F 18/2431; G06V 10/60; G06V 20/50; G06N 3/04
See application file for complete search history.

(56) References Cited

U.S. PATENT DOCUMENTS

| | | | |
|---|---|---|---|
| 10,607,083 B2 | 3/2020 | Pekelny et al. | |
| 10,663,740 B2 | 5/2020 | Osterhout et al. | |
| 2019/0005546 A1* | 1/2019 | Chen | G06Q 30/0267 |
| 2019/0250805 A1 | 8/2019 | Brewer et al. | |
| 2020/0302681 A1* | 9/2020 | Totty | G06T 15/205 |

FOREIGN PATENT DOCUMENTS

| | | | | |
|---|---|---|---|---|
| WO | WO-2019067642 A1 * | 4/2019 | | G06K 9/00201 |
| WO | 2019232005 A1 | 12/2019 | | |

OTHER PUBLICATIONS

Barakonyi, István, Thomas Psik, and Dieter Schmalstieg. "Agents that talk and hit back: Animated agents in augmented reality." Third IEEE and ACM International Symposium on Mixed and Augmented Reality. IEEE, 2004. (Year: 2004).*

Tang, Jeff KT, et al. "AR interior designer: Automatic furniture arrangement using spatial and functional relationships." 2014 International Conference on Virtual Systems & Multimedia (VSMM). IEEE, 2014. (Year: 2014).*

* cited by examiner

*Primary Examiner* — Vu Le
*Assistant Examiner* — Tracy Mangialaschi
(74) *Attorney, Agent, or Firm* — DLA Piper LLP (US)

(57) ABSTRACT

In one implementation, a method of presenting content is performed by a device including an image sensor, a display one or more processors, and non-transitory memory. The method includes obtaining, using the image sensor, an image of a physical environment. The method includes classifying, based on the image of the physical environment, the physical environment as a particular environment type of a plurality of environment types. The method includes obtaining content based on the particular environment type. The method includes displaying, on the display, a representation of the content in association with the physical environment.

25 Claims, 17 Drawing Sheets

METHOD AND DEVICE FOR PRESENTING CONTENT BASED ON ENVIRONMENT TYPE

CROSS-REFERENCE TO RELATED APPLICATIONS

This application claims priority to U.S. Provisional Patent App. No. 63/111,885, filed on Nov. 10, 2020, which is hereby incorporated by reference in its entirety.

TECHNICAL FIELD

The present disclosure generally relates to systems, methods, and devices for presenting content to a user, and in particular, relates to presenting content to a user based on an environment type of a physical environment.

BACKGROUND

A significant aspect of an immersive XR experience is the presentation of XR content based on current conditions. Examples include XR content presented based on the location of the user, the time of day, or the time of year.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
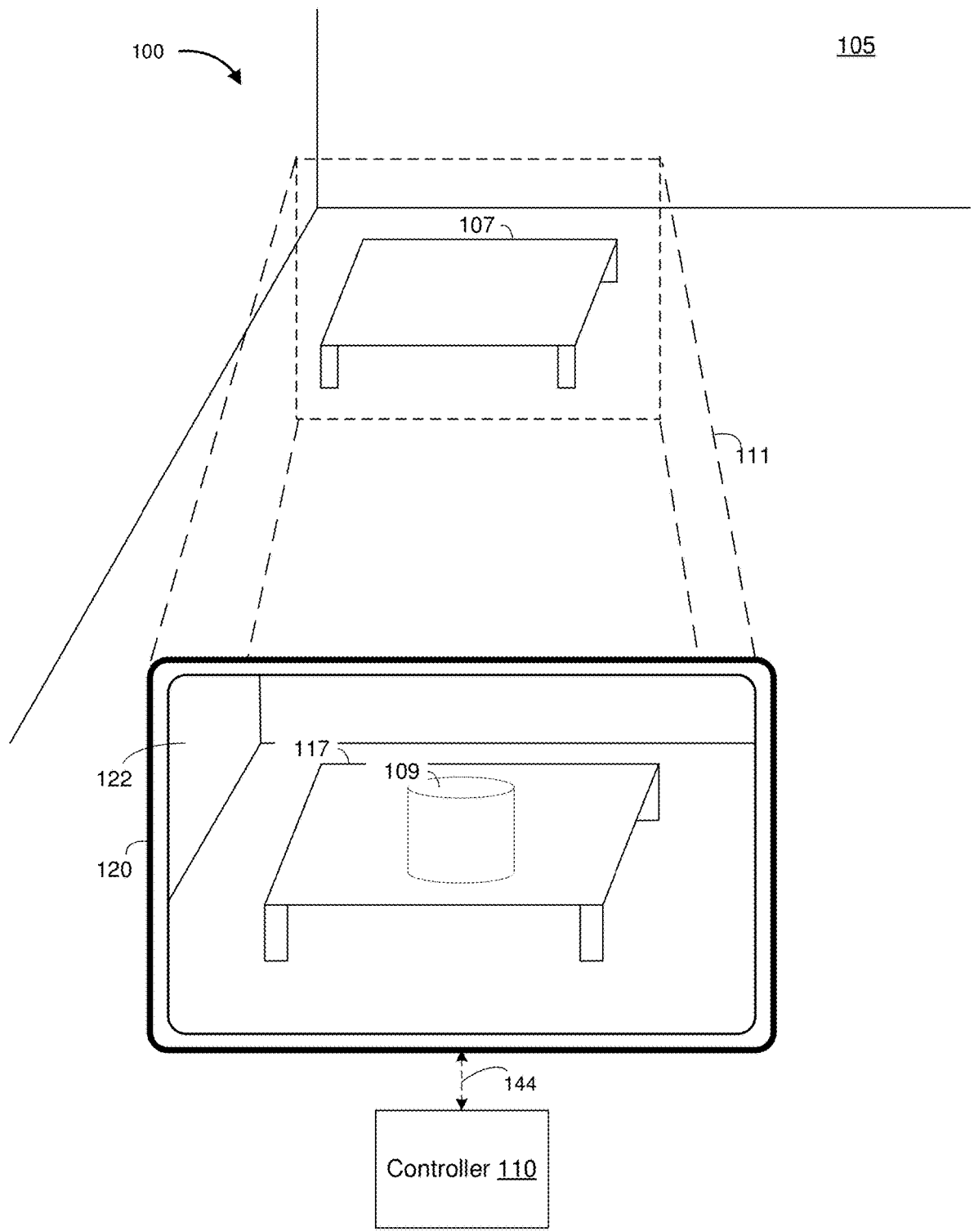
FIG. 1 is a block diagram of an example operating environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for presenting content. In various implementations, the method is performed by a device including an image sensor, a display, one or more processors, and non-transitory memory. The method includes obtaining, using the image sensor, an image of a physical environment. The method includes classifying, based on the image of the physical environment, the physical environment as a particular environment type of a plurality of environment types. The method includes obtaining content based on the particular environment type. The method includes displaying, on the display, a representation of the content in association with the physical environment.

In accordance with some implementations, a device includes one or more processors, a non-transitory memory, and one or more programs; the one or more programs are stored in the non-transitory memory and configured to be executed by the one or more processors. The one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

DESCRIPTION

A physical environment refers to a physical place that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As an example, the XR system may detect movement of the electronic device presenting the XR environment (e.g., a mobile phone, a tablet, a laptop, a head-mounted device, and/or the like) and, in response, adjust graphical content and an acoustic field presented by the electronic device to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example implementations described herein.

As noted above, in order to provide an immersive XR experience, XR content is presented, either automatically or in response to a user request, based on current conditions of the physical environment upon which the XR environment is based. As disclosed herein, the physical environment is classified as a particular environment type based, at least in part, on an image of the physical environment. Further, XR content is presented based on the particular environment type.

FIG. 1 is a block diagram of an example operating environment 100 in accordance with some implementations. While pertinent features are shown, those of ordinary skill in the art will appreciate from the present disclosure that various other features have not been illustrated for the sake of brevity and-so as not to obscure more pertinent aspects of the example implementations disclosed herein. To that end, as a non-limiting example, the operating environment 100 includes a controller 110 and an electronic device 120.

In some implementations, the controller 110 is configured to manage and coordinate an XR experience for the user. In some implementations, the controller 110 includes a suitable combination of software, firmware, and/or hardware. The controller 110 is described in greater detail below with respect to FIG. 2. In some implementations, the controller 110 is a computing device that is local or remote relative to the physical environment 105. For example, the controller 110 is a local server located within the physical environment 105. In another example, the controller 110 is a remote server located outside of the physical environment 105 (e.g., a cloud server, central server, etc.). In some implementations, the controller 110 is communicatively coupled with the electronic device 120 via one or more wired or wireless communication channels 144 (e.g., BLUETOOTH, IEEE 802.11x, IEEE 802.16x, IEEE 802.3x, etc.). In another example, the controller 110 is included within the enclosure of the electronic device 120. In some implementations, the functionalities of the controller 110 are provided by and/or combined with the electronic device 120.

In some implementations, the electronic device 120 is configured to provide the XR experience to the user. In some implementations, the electronic device 120 includes a suitable combination of software, firmware, and/or hardware. According to some implementations, the electronic device 120 presents, via a display 122, XR content to the user while the user is physically present within the physical environment 105 that includes a table 107 within the field-of-view 111 of the electronic device 120. As such, in some implementations, the user holds the electronic device 120 in his/her hand(s). In some implementations, while providing XR content, the electronic device 120 is configured to display an XR object (e.g., an XR cylinder 109) and to enable video pass-through of the physical environment 105 (e.g., including a representation 117 of the table 107) on a display 122. The electronic device 120 is described in greater detail below with respect to FIG. 3.

According to some implementations, the electronic device 120 provides an XR experience to the user while the user is virtually and/or physically present within the physical environment 105.

In some implementations, the user wears the electronic device 120 on his/her head. For example, in some implementations, the electronic device includes a head-mounted system (HMS), head-mounted device (HMD), or head-mounted enclosure (HME). As such, the electronic device 120 includes one or more XR displays provided to display the XR content. For example, in various implementations, the electronic device 120 encloses the field-of-view of the user. In some implementations, the electronic device 120 is a handheld device (such as a smartphone or tablet) configured to present XR content, and rather than wearing the electronic device 120, the user holds the device with a display directed towards the field-of-view of the user and a camera directed towards the physical environment 105. In some implementations, the handheld device can be placed within an enclosure that can be worn on the head of the user. In some implementations, the electronic device 120 is replaced with an XR chamber, enclosure, or room configured to present XR content in which the user does not wear or hold the electronic device 120.

Figure 2:
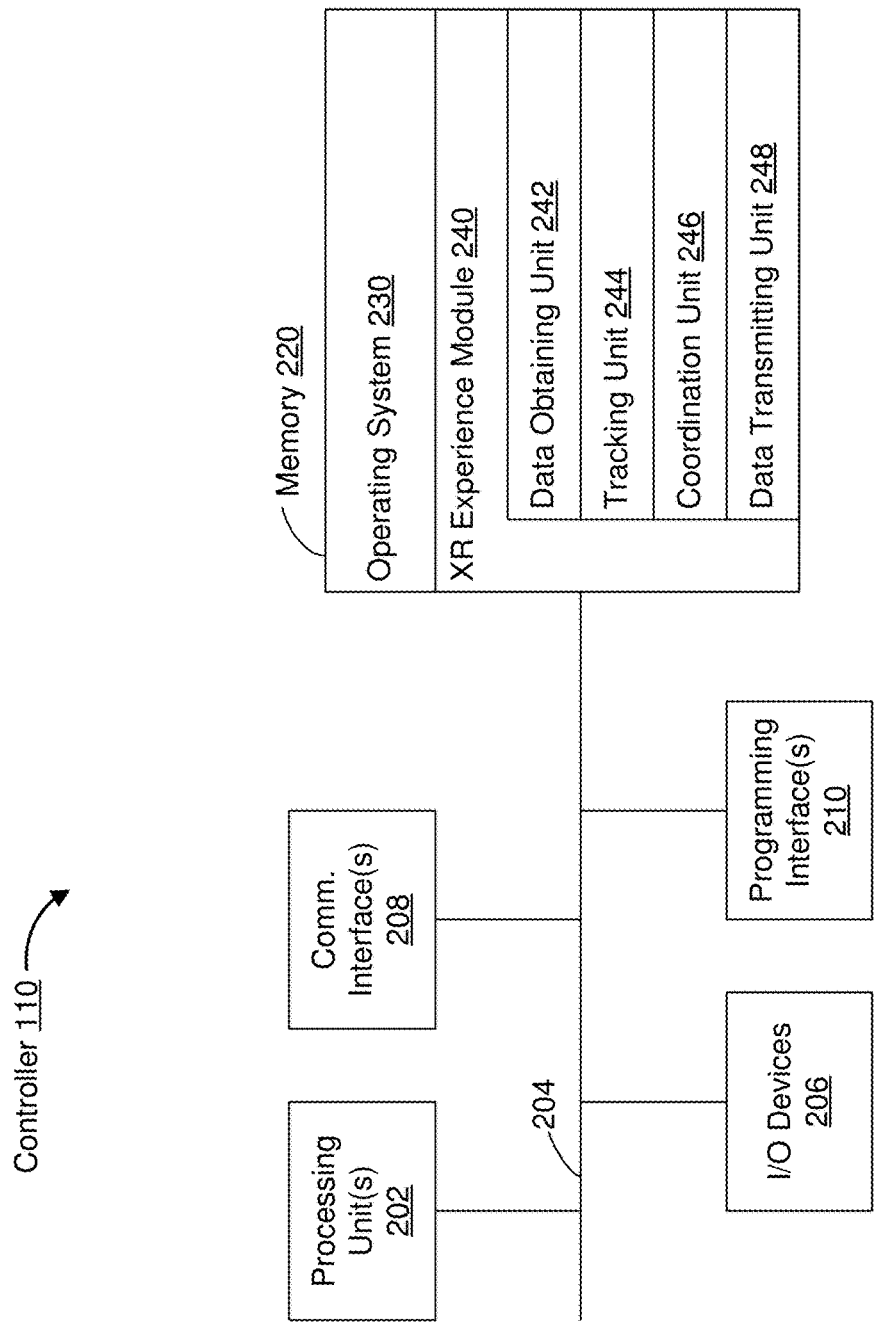
FIG. 2 is a block diagram of an example controller in accordance with some implementations.

FIG. 2 is a block diagram of an example of the controller 110 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some implementations, the one or more communication buses 204 include circuitry that interconnects and controls communications between system components. In some implementations, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some implementations, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some implementations, the memory 220 or the non-transitory computer readable storage medium of the memory 220 stores the following programs, modules and data structures, or a subset thereof including an optional operating system 230 and an XR experience module 240.

The operating system 230 includes procedures for handling various basic system services and for performing hardware dependent tasks. In some implementations, the XR experience module 240 is configured to manage and coordinate one or more XR experiences for one or more users (e.g., a single XR experience for one or more users, or multiple XR experiences for respective groups of one or more users). To that end, in various implementations, the XR experience module 240 includes a data obtaining unit 242, a tracking unit 244, a coordination unit 246, and a data transmitting unit 248.

In some implementations, the data obtaining unit 242 is configured to obtain data (e.g., presentation data, interaction data, sensor data, location data, etc.) from at least the electronic device 120 of FIG. 1. To that end, in various implementations, the data obtaining unit 242 includes instructions and/or logic therefor, and heuristics and metadata therefor.

In some implementations, the tracking unit 244 is configured to map the physical environment 105 and to track the position/location of at least the electronic device 120 with respect to the physical environment 105 of FIG. 1. To that end, in various implementations, the tracking unit 244 includes instructions and/or logic therefor, and heuristics and metadata therefor.

In some implementations, the coordination unit 246 is configured to manage and coordinate the XR experience presented to the user by the electronic device 120. To that end, in various implementations, the coordination unit 246 includes instructions and/or logic therefor, and heuristics and metadata therefor.

In some implementations, the data transmitting unit 248 is configured to transmit data (e.g., presentation data, location data, etc.) to at least the electronic device 120. To that end, in various implementations, the data transmitting unit 248 includes instructions and/or logic therefor, and heuristics and metadata therefor.

Although the data obtaining unit 242, the tracking unit 244, the coordination unit 246, and the data transmitting unit 248 are shown as residing on a single device (e.g., the controller 110), it should be understood that in other implementations, any combination of the data obtaining unit 242, the tracking unit 244, the coordination unit 246, and the data transmitting unit 248 may be located in separate computing devices.

Moreover, FIG. 2 is intended more as functional description of the various features that may be present in a particular implementation as opposed to a structural schematic of the implementations described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 3:
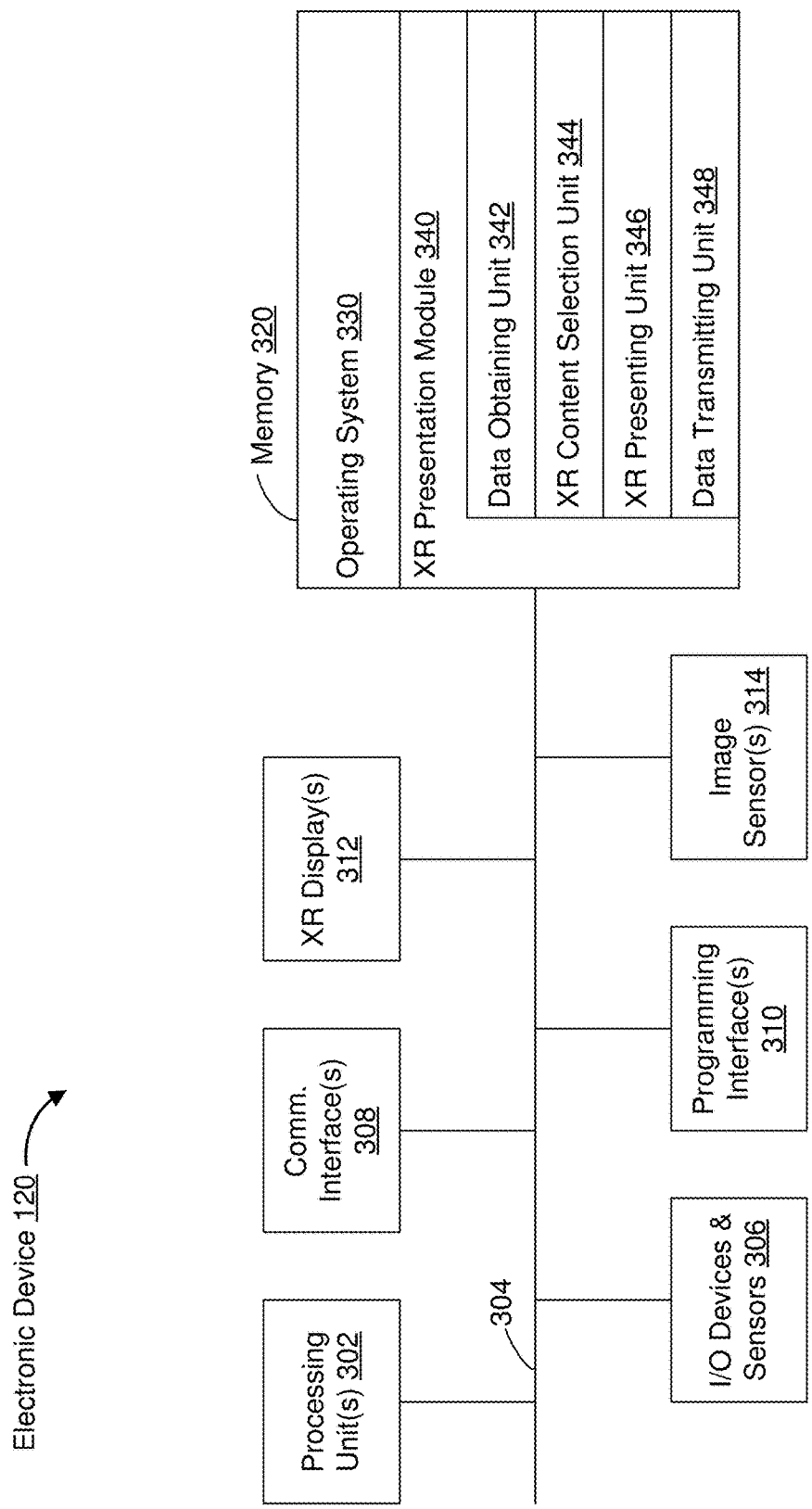
FIG. 3 is a block diagram of an example electronic device in accordance with some implementations.

FIG. 3 is a block diagram of an example of the electronic device 120 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the electronic device 120 includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more XR displays 312, one or more optional interior- and/or exterior-facing image sensors 314, a memory 320, and one or more communication buses 304 for interconnecting these and various other components.

In some implementations, the one or more communication buses 304 include circuitry that interconnects and controls communications between system components. In some implementations, the one or more I/O devices and sensors 306 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more XR displays 312 are configured to provide the XR experience to the user. In some implementations, the one or more XR displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some implementations, the one or more XR displays 312 correspond to diffractive, reflective, polarized, holographic, etc. waveguide displays. For example, the electronic device 120 includes a single XR display. In another example, the electronic device includes an XR display for each eye of the user. In some implementations, the one or more XR displays 312 are capable of presenting MR and VR content.

In some implementations, the one or more image sensors 314 are configured to obtain image data that corresponds to at least a portion of the face of the user that includes the eyes of the user (any may be referred to as an eye-tracking camera). In some implementations, the one or more image sensors 314 are configured to be forward-facing so as to obtain image data that corresponds to the scene as would be viewed by the user if the electronic device 120 was not present (and may be referred to as a scene camera). The one or more optional image sensors 314 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 320 includes high-speed random-access memory, such as DRAM, SRAM, DDR RAM, or other random-access solid-state memory devices. In some implementations, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some implementations, the memory 320 or the non-transitory computer readable storage medium of the memory 320 stores the following programs, modules and data structures, or a subset thereof including an optional operating system 330 and an XR presentation module 340.

The operating system 330 includes procedures for handling various basic system services and for performing hardware dependent tasks. In some implementations, the XR presentation module 340 is configured to present XR content to the user via the one or more XR displays 312. To that end, in various implementations, the XR presentation module 340 includes a data obtaining unit 342, an XR content selection unit 344, an XR presenting unit 346, and a data transmitting unit 348.

In some implementations, the data obtaining unit 342 is configured to obtain data (e.g., presentation data, interaction data, sensor data, location data, etc.) from at least the controller 110 of FIG. 1. To that end, in various implementations, the data obtaining unit 342 includes instructions and/or logic therefor, and heuristics and metadata therefor.

In some implementations, the XR content selection unit 344 is configured to obtain content based on an environment type of a physical environment. To that end, in various implementations, the XR content selection unit 344 includes instructions and/or logic therefor, and heuristics and metadata therefor.

In some implementations, the XR presenting unit 346 is configured to provide feedback regarding the plurality of temporal metrics via the one or more XR displays 312. To that end, in various implementations, the XR presenting unit 346 includes instructions and/or logic therefor, and heuristics and metadata therefor.

In some implementations, the data transmitting unit 348 is configured to transmit data (e.g., presentation data, location data, etc.) to at least the controller 110. In some implementations, the data transmitting unit 348 is configured to transmit authentication credentials to the electronic device. To that end, in various implementations, the data transmitting unit 348 includes instructions and/or logic therefor, and heuristics and metadata therefor.

Although the data obtaining unit 342, the XR content selection unit 344, the XR presenting unit 346, and the data transmitting unit 348 are shown as residing on a single device (e.g., the electronic device 120), it should be understood that in other implementations, any combination of the data obtaining unit 342, the XR content selection unit 344, the XR presenting unit 346, and the data transmitting unit 348 may be located in separate computing devices.

Moreover, FIG. 3 is intended more as a functional description of the various features that could be present in a particular implementation as opposed to a structural schematic of the implementations described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

FIGS. 4A-6C illustrate various XR environments based on various physical environments. In various implementations, the various XR environments are displayed as part of an XR application executed by an electronic device. In various implementations, the various XR environments include a virtual caveman performing various actions in the physical environments. For example, in various implementations, the XR application is associated with an area (e.g., a national park) including the various physical environments and is intended to illustrate how prehistoric people lived in the national park in the past. In various implementations, audio from a narrator (which may be playing the part of the virtual caveman) is concurrently played to a user while the XR application is executed and the virtual caveman is displayed to the user. In various implementations, the audio includes narration explaining what the virtual caveman is currently doing or searching for, e.g., an objective of the virtual caveman.

Figure 4A:
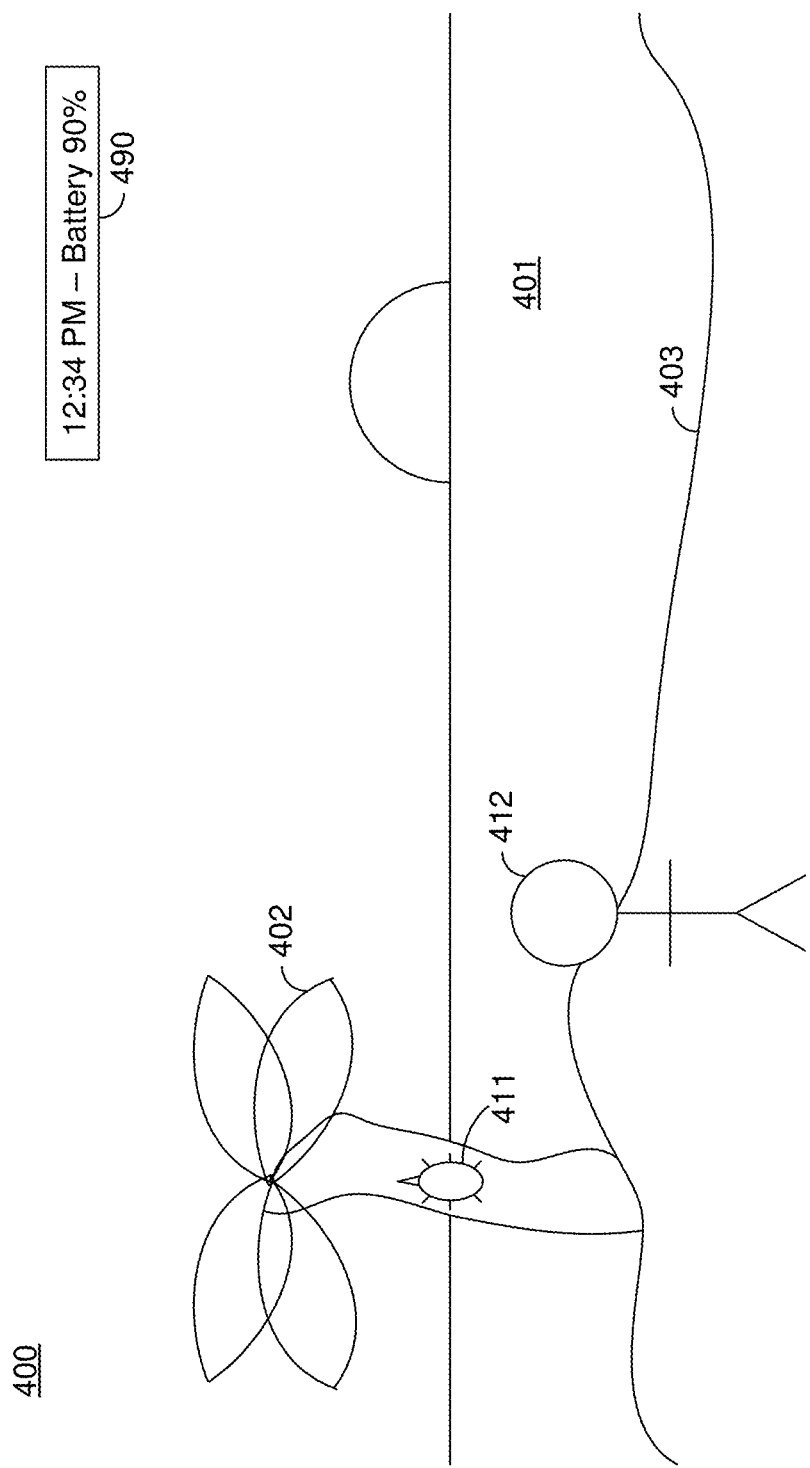
FIGS. 4A-4C illustrate a first XR environment based on a physical environment classified as a coastal environment.
Figure 4B:
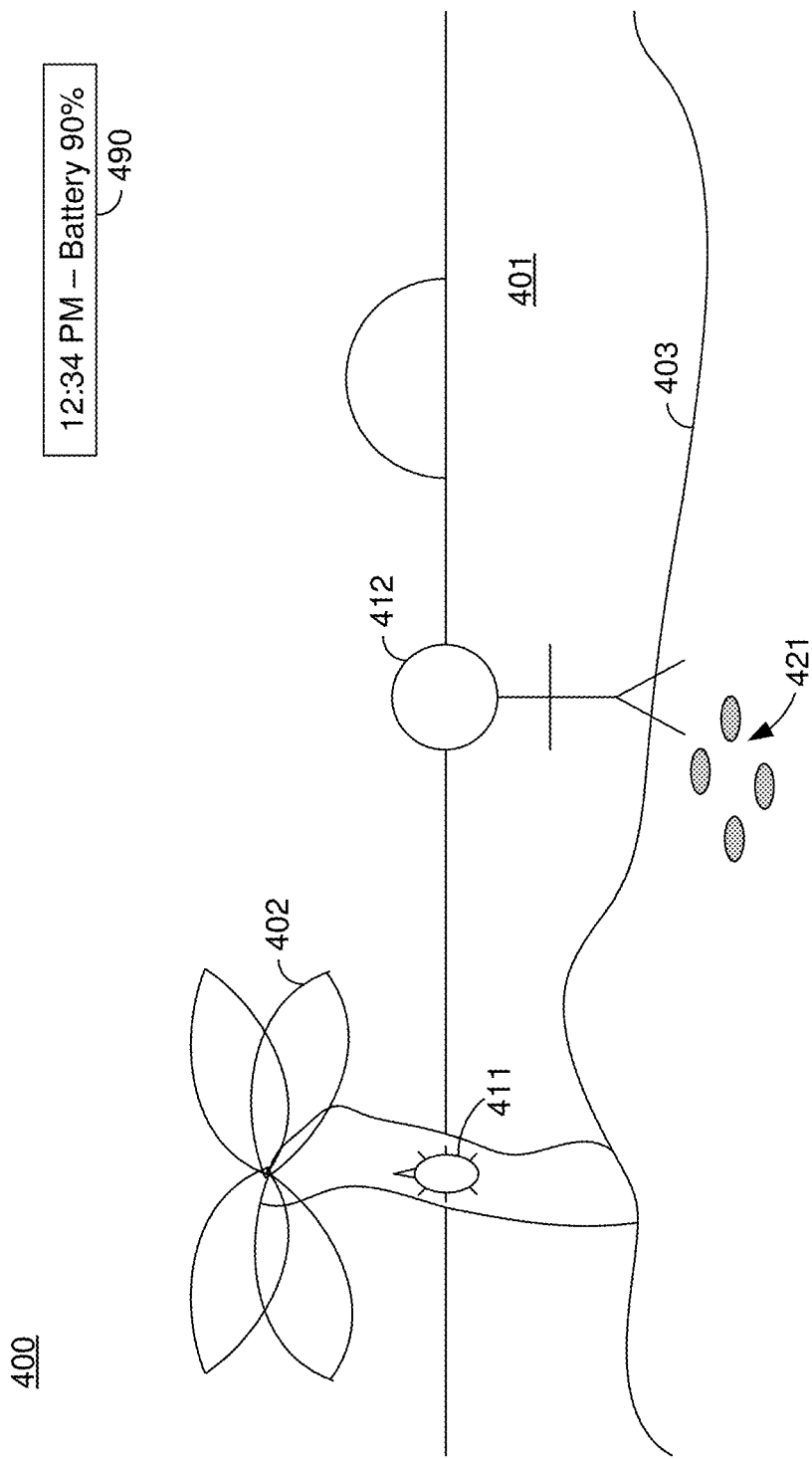
Figure 4C:
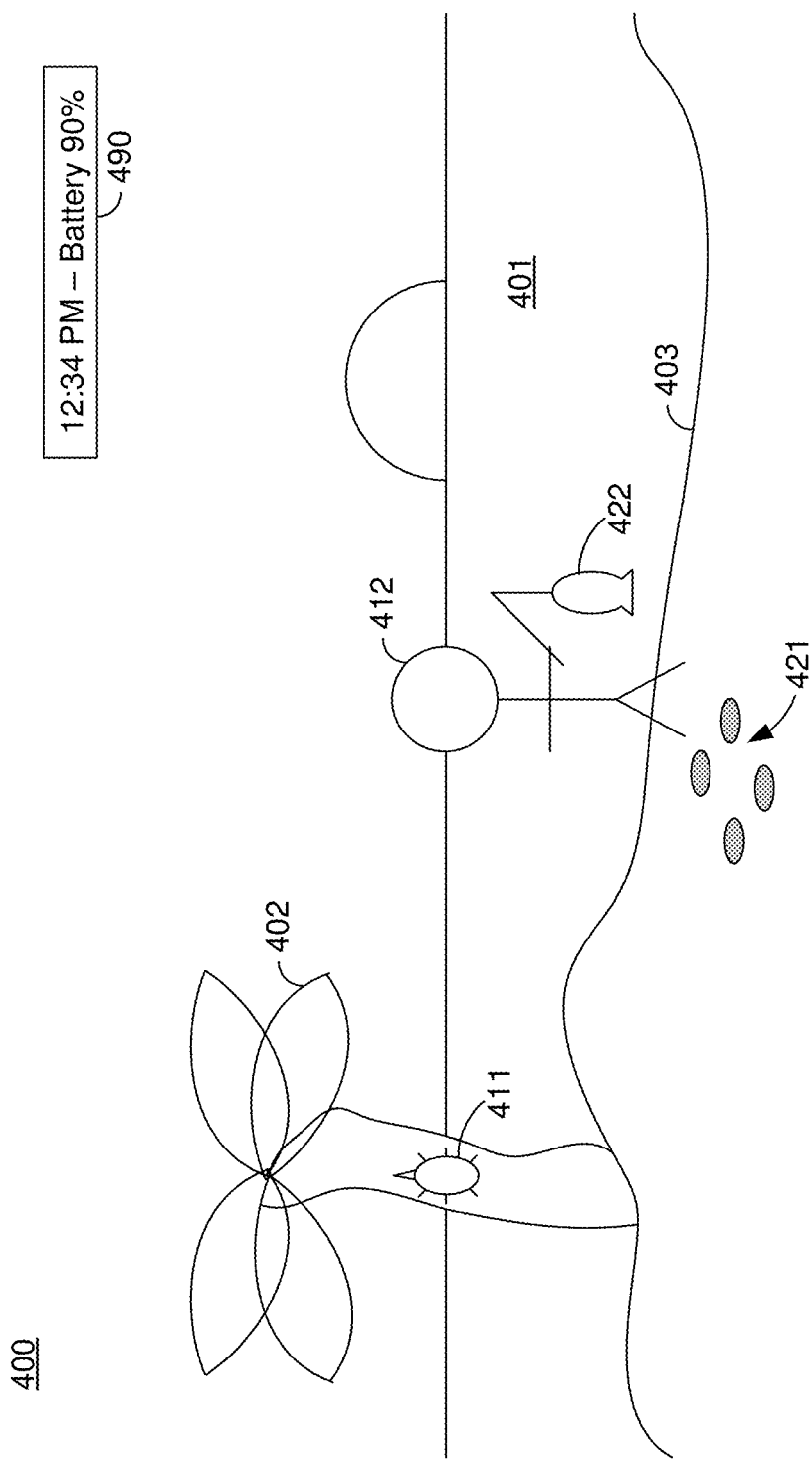

FIGS. 4A-4C illustrate a first XR environment 400 based on a first physical environment classified as a coastal environment. FIGS. 4A-4C illustrate the first XR environment 400 from the perspective of a user. In various implementations, the perspective of the user is from a location of an image sensor of an electronic device operated by the user. For example, in various implementations, the electronic device is a handheld electronic device and the perspective of the user is from a location of the image sensor of the handheld electronic device directed towards the first physical environment. In various implementations, the perspective of the user is from the location of an eye of a user of the electronic device. For example, in various implementations, the electronic device is a head-mounted electronic device and the perspective of the user is from a location of the eye of the user directed towards the first physical environment, generally approximating the field-of-view of the user were the head-mounted electronic device not present. In various implementations, the perspective of the user is from the location of an avatar of the user. For example, in various implementations, the first XR environment 400 is a virtual environment and the perspective of the user is from location of an avatar or other representation of the user directed towards the virtual environment.

FIGS. 4A-4C illustrate the first XR environment 400 during a series of time periods. In various implementations, each time period is an instant, a fraction of a second, a second, a few seconds, a few hours, a few days, or any length of time.

The first XR environment 400 includes a plurality of objects, including one or more real objects (e.g., an ocean 401, a palm tree 402, and sandy ground 403) and one or more virtual objects (e.g., a virtual bug 411, a virtual caveman 412, and a device status indicator 490). In various implementations, certain objects (such as the real objects 401-403, the virtual bug 411, and the virtual caveman 412) are displayed at a location in the first XR environment 400, e.g., at a location defined by three coordinates in a three-dimensional (3D) XR coordinate system. Accordingly, when the electronic device moves in the first XR environment 400 (e.g., changes position and/or orientation), the objects are moved on the display of the electronic device, but retain their location in the first XR environment 400. In various implementations, certain virtual objects (such as the device status indicator 490) are displayed at locations on the display such that when the electronic device moves in the first XR environment 400, the objects are stationary on the display of the electronic device. The device status indicator 490 displays information regarding the status of the electronic device, such as the time and/or battery remaining.

FIG. 4A illustrates the first XR environment 400 during a first time period.

During the first time period, the electronic device, based at least in part on an image of the first physical environment, classifies the first physical environment as a coastal environment. In various implementations, the electronic device classifies the first physical environment by applying a neural network to the image of the first physical environment. In various implementations, the electronic device classifies the first physical environment based on detected objects in the first physical environment, such as the ocean 401, the palm tree 402, and/or the sandy ground 403. In various implementations, the electronic device classifies the first physical environment based on a plurality of detected objects. For example, based on detecting the sandy ground 403, the electronic device could classify the first physical environment as a coastal environment or a desert environment. However, based on also detecting the ocean 401 and/or the palm tree 402, the electronic device classifies the first physical environment as a coastal environment.

As described in further detail below, in various implementations, the electronic device classifies a physical environment using additional or alternative data, such as content displayed on a screen in the physical environment, a point cloud of the physical environment, a physical location of the physical environment, an environmental condition of the physical environment, a lighting characteristic of the physical environment, on a time at the physical environment.

In response to classifying the first physical environment as a coastal environment, the electronic device obtains content relevant to a coastal environment, including the virtual bug 411 and the virtual caveman 412. In various implementations, when a physical environment is classified based on at least one detected object, at least a portion of the obtained content is displayed in association with the detected object. For example, in FIGS. 4A-4C, the virtual bug 411 is displayed in association with the palm tree 402. In various implementations, the virtual bug 411 is selected from a plurality of different virtual bug types based on the particular environment type. For example, in a coastal environment as in FIGS. 4A-4C, the virtual bug 411 may be a virtual palm weevil and, in a desert environment, a virtual bug may be a virtual scarab.

In various implementations, the obtained content includes an objective-effectuator associated with various objectives that interacts with the first XR environment to further those objectives. In various implementations, the objectives are based on the particular environment type. For example, in FIG. 4A, based on the first physical environment being classified as a coastal environment, the virtual caveman 412 is associated with an objective to move towards water and begin fishing.

FIG. 4B illustrates the first XR environment 400 during a second time period subsequent to the first time period. During the second time period, the virtual caveman 412, in accordance with the objective to move towards water and begin fishing, has moved within the first XR environment towards the ocean 401. In moving towards the ocean 401, the virtual caveman 412 has left virtual footprints 421 in the sandy ground 403. In various implementations, as the virtual caveman 412 walks towards the ocean 401, the virtual footprints 421 are sequentially displayed and a sound based on the particular environment type is played as each of the virtual footprints 421 appear. For example, an audio file of stepping through sand is played for each footstep when the physical environment is classified as a coastal environment and an audio file of stepping through snow is played for each footstep when the physical environment is classified as a tundra environment.

FIG. 4C illustrates the first XR environment during a third time period subsequent to the second time period. During the third time period, the virtual caveman 412, in accordance with the objective to move towards the water and begin fishing, has successfully caught a virtual fish 422. In various implementations, the virtual fish 422 is selected from a plurality of different virtual fish types based on the particular environment type. For example, in a coastal environment as in FIG. 4C, the virtual fish 422 may be a virtual seabass (a saltwater or ocean-dwelling fish) and, in a littoral environment, a virtual fish may be a virtual catfish (a freshwater or lake-dwelling fish). In various implementations, the virtual fish 422 is selected from a plurality of virtual fish types based on a particular time, e.g., a historic era or a modern era.

Figure 5A:
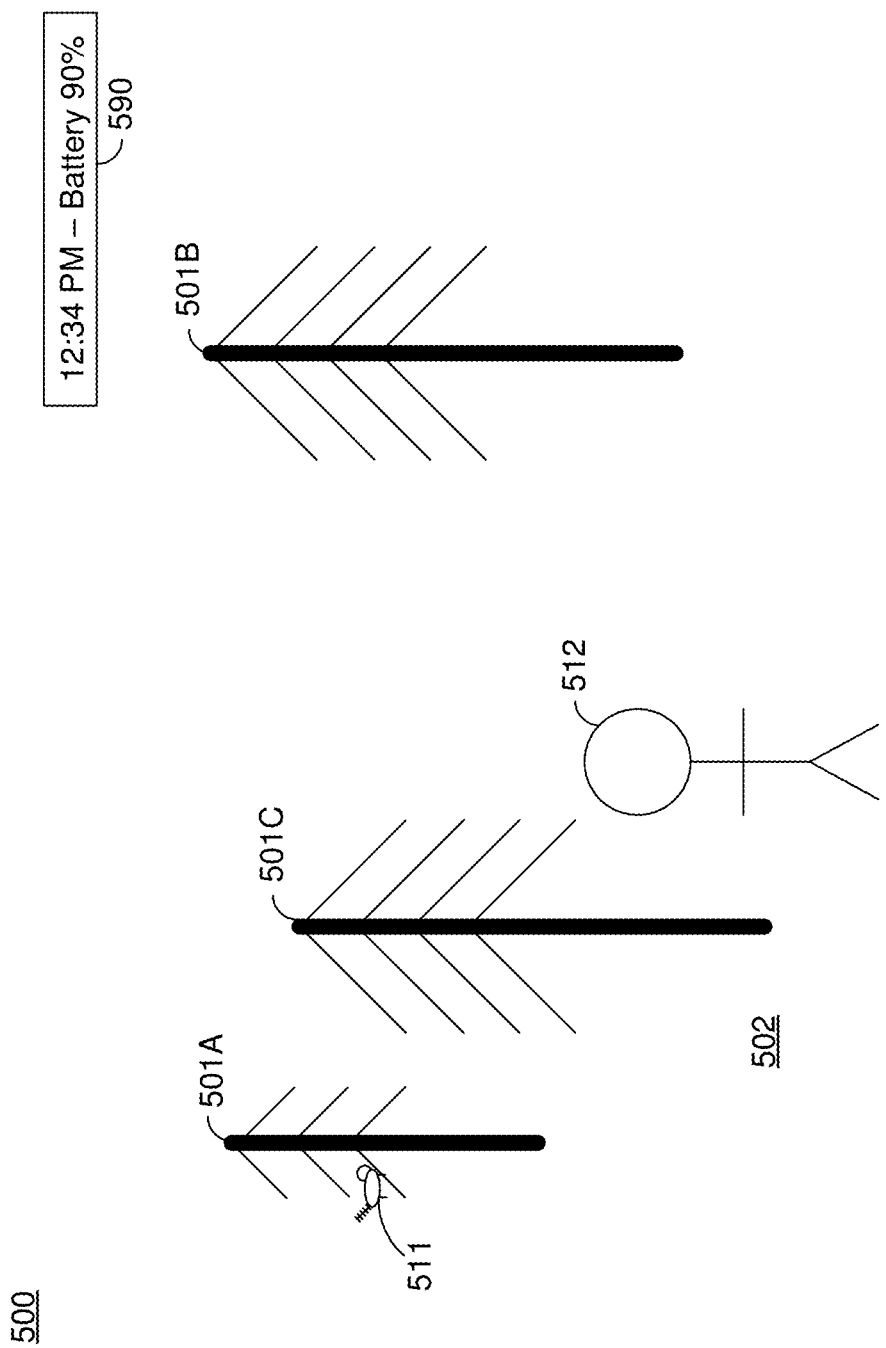
FIGS. 5A-5C illustrate a second XR environment based on a physical environment classified as a forest environment.
Figure 5B:
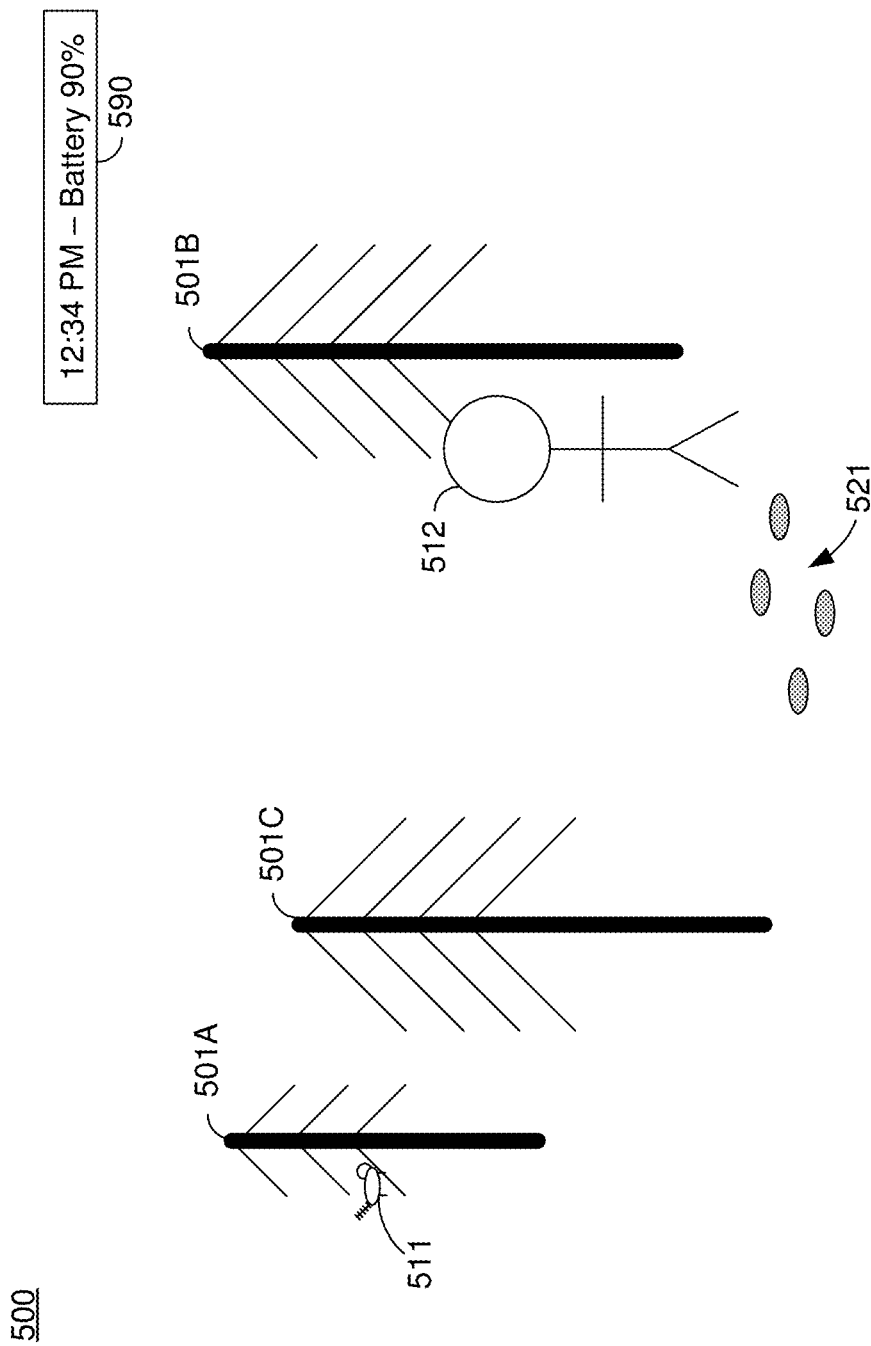
Figure 5C:
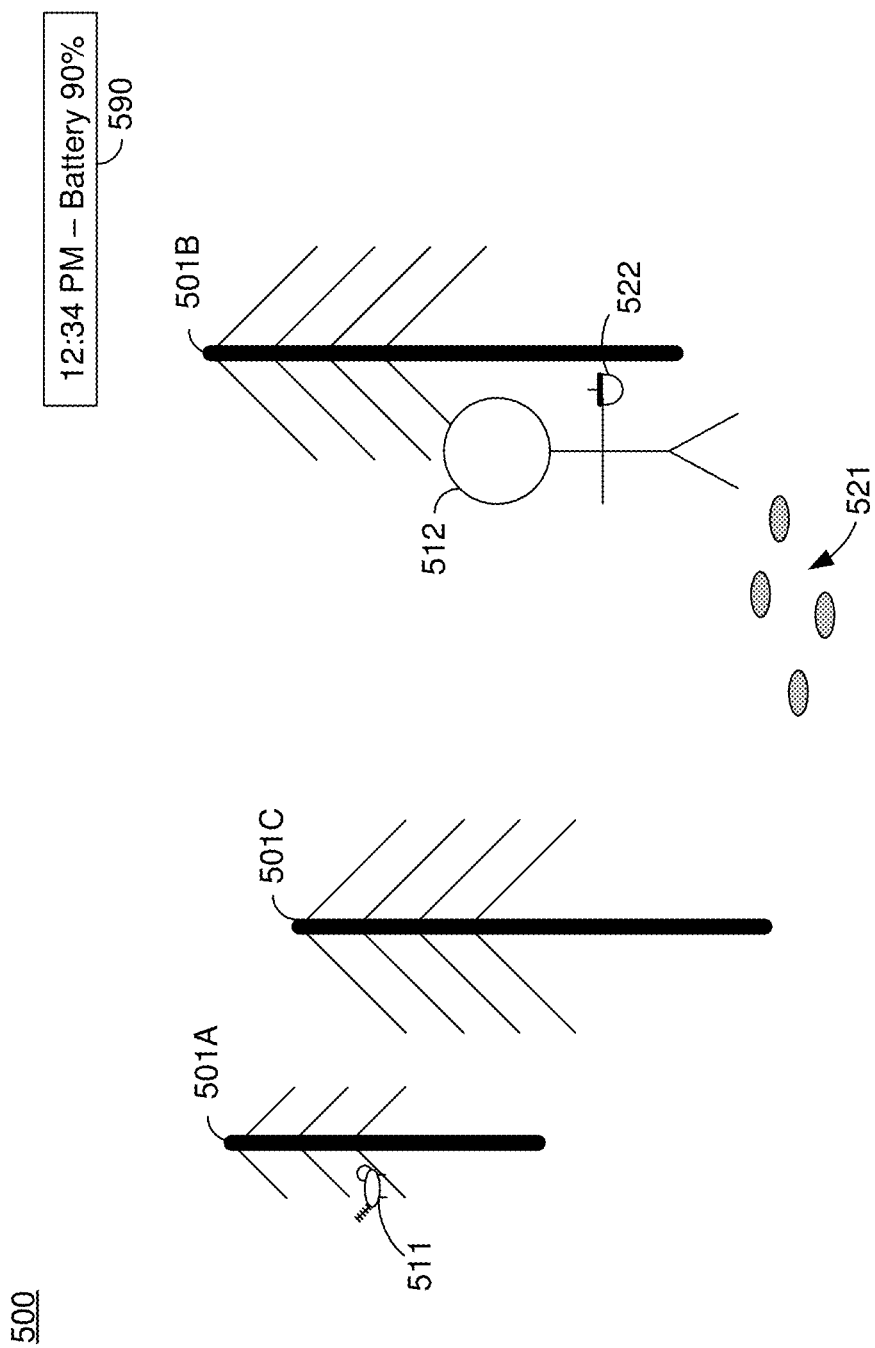

FIGS. 5A-5C illustrate a second XR environment 500 based on a second physical environment classified as a forest environment. FIGS. 5A-5C illustrate the second XR environment 500 from the perspective of a user. FIGS. 5A-5C illustrate the second XR environment 500 during a series of time periods.

The second XR environment 500 includes a plurality of objects, including one or more real objects (e.g., a plurality of trees 501A-501C and a leafy ground 502) and one or more virtual objects (e.g., a virtual squirrel 511, a virtual caveman 512, and a device status indicator 590). In various implementations, certain objects (such as the real objects 501A-501C and 502, the virtual squirrel 511, and the virtual caveman 512) are displayed at a location in the second XR environment 500, e.g., at a location defined by three coordinates in a three-dimensional (3D) XR coordinate system. Accordingly, when the electronic device moves in the second XR environment 500 (e.g., changes position and/or orientation), the objects are moved on the display of the electronic device, but retain their location in the second XR environment 500. In various implementations, certain virtual objects (such as the device status indicator 590) are displayed at locations on the display such that when the electronic device moves in the second XR environment 500, the objects are stationary on the display of the electronic device. The device status indicator 590 displays information regarding the status of the electronic device, such as the time and/or battery remaining.

FIG. 5A illustrates the second XR environment 500 during a first time period. During the first time period, the electronic device, based at least in part on an image of the second physical environment, classifies the second physical environment as a forest environment. In various implementations, the electronic device classifies the second physical environment by applying a neural network to the image of the second physical environment. In various implementations, the electronic device classifies the second physical environment based on detected objects in the second physical environment, such as the plurality of trees 501A-501C and/or the leafy ground 502. In various implementations, the electronic device classifies the second physical environment based on a plurality of detected objects. For example, based on detecting a first tree 501A, the electronic device could classify the second physical environment as a forest environment or a chaparral environment. However, based on also detecting the plurality of trees 501A-501A (e.g., more than a threshold number of trees), the electronic device classifies the second physical environment as a forest environment.

In response to classifying the second physical environment as a forest environment, the electronic device obtains content relevant to a forest environment, including the virtual squirrel 511 and the virtual caveman 512. In various implementations, when a physical environment is classified based on at least one detected object, at least a portion of the obtained content is displayed in association with the detected object. For example, in FIGS. 5A-5C, the virtual squirrel 511 is displayed in association with the first tree 501A.

In various implementations, the obtained content includes an objective-effectuator associated with various objectives that interacts with the second XR environment 500 to further those objectives. In various implementations, the objectives are based on the particular environment type. For example, in FIG. 5A, based on the second physical environment being classified as a forest environment, the virtual caveman 512 is associated with an objective to move towards a tree and gather fruit.

FIG. 5B illustrates the second XR environment 500 during a second time period subsequent to the second time period. During the second time period, the virtual caveman 512, in accordance with the objective to move towards a tree and gather fruit, has moved with the second XR environment 500 towards a second tree 501B. In moving towards the second tree 501B, the virtual caveman 512 has left virtual footprints 521 in the leafy ground 502. In various implementations, as the virtual caveman 512 walks towards the second tree 501B, the virtual footprints 521 are sequentially displayed and a sound based on the particular environment type is played as each of the virtual footprints 521 appear. For example, an audio file of stepping through leaves is played for each footstep when the physical environment is classified as a forest environment and an audio file of stepping through snow is played for each footstep when the physical environment is classified as a tundra environment.

FIG. 5C illustrates the second XR environment 500 during a third time period subsequent to the second time period. During the third time period, the virtual caveman 512, in accordance with the objective to move towards a tree and gather fruit, has successfully gathered a virtual fruit 522. In various implementations, the virtual fruit 522 is selected from a plurality of different virtual fruit types based on the particular environment type. For example, in a forest environment as in FIG. 5C, the virtual fruit 522 may be a virtual acorn and, in a chaparral environment, a virtual fruit may be virtual berries. In various implementations, the electronic device determines a tree type of the second tree 501B, e.g., based on the image of the second physical environment, and the virtual fruit 522 is selected from a plurality of different virtual fruit types based on a tree type of the second tree. For example, the virtual fruit may be a virtual acorn if the second tree 501B is determined to be an oak tree and the virtual fruit may be a virtual apple if the second tree 501B is determined to be an apple tree.

Figure 6A:
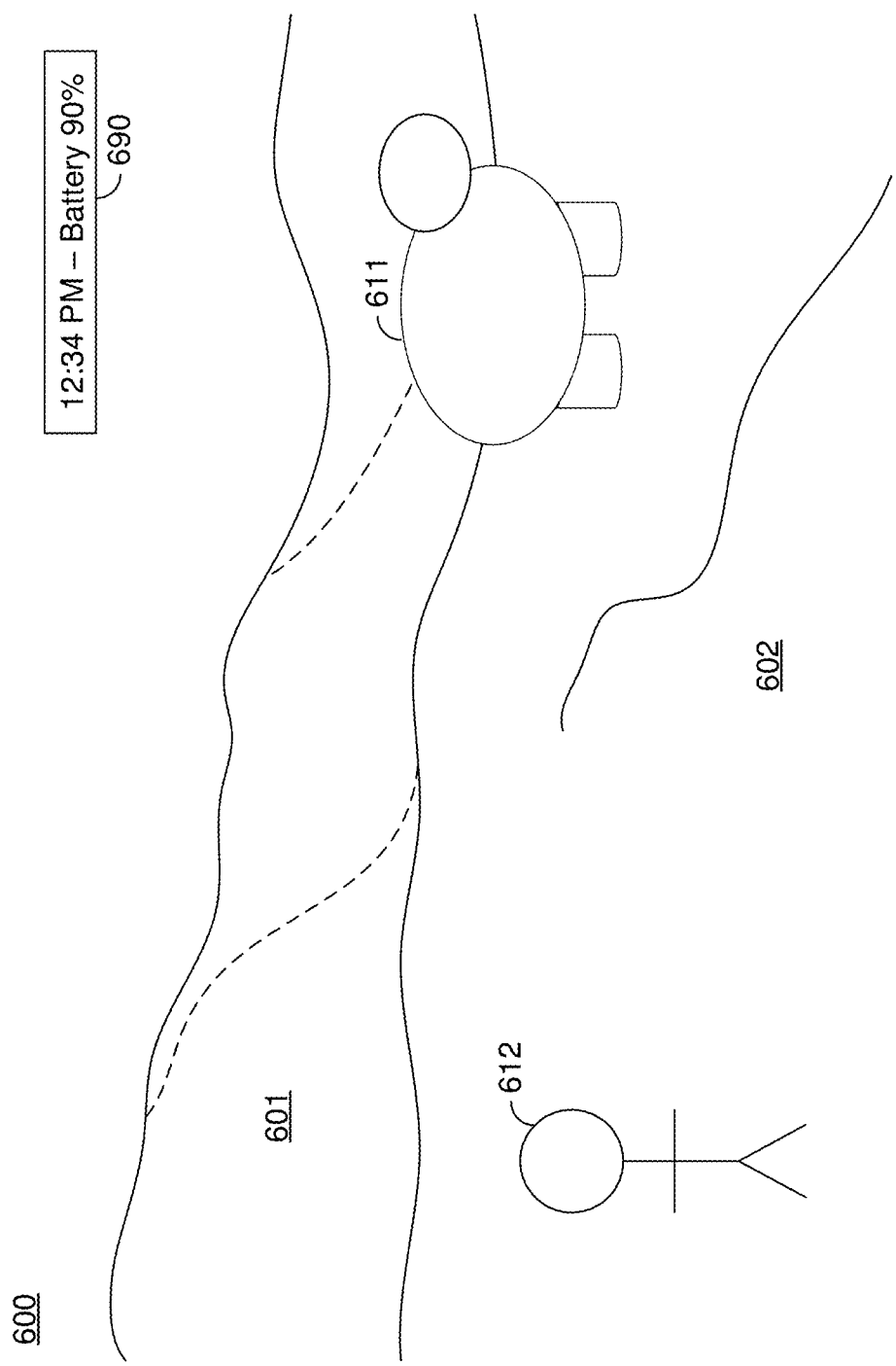
FIGS. 6A-6C illustrate a third XR environment based on a physical environment classified as a tundra environment.
Figure 6B:
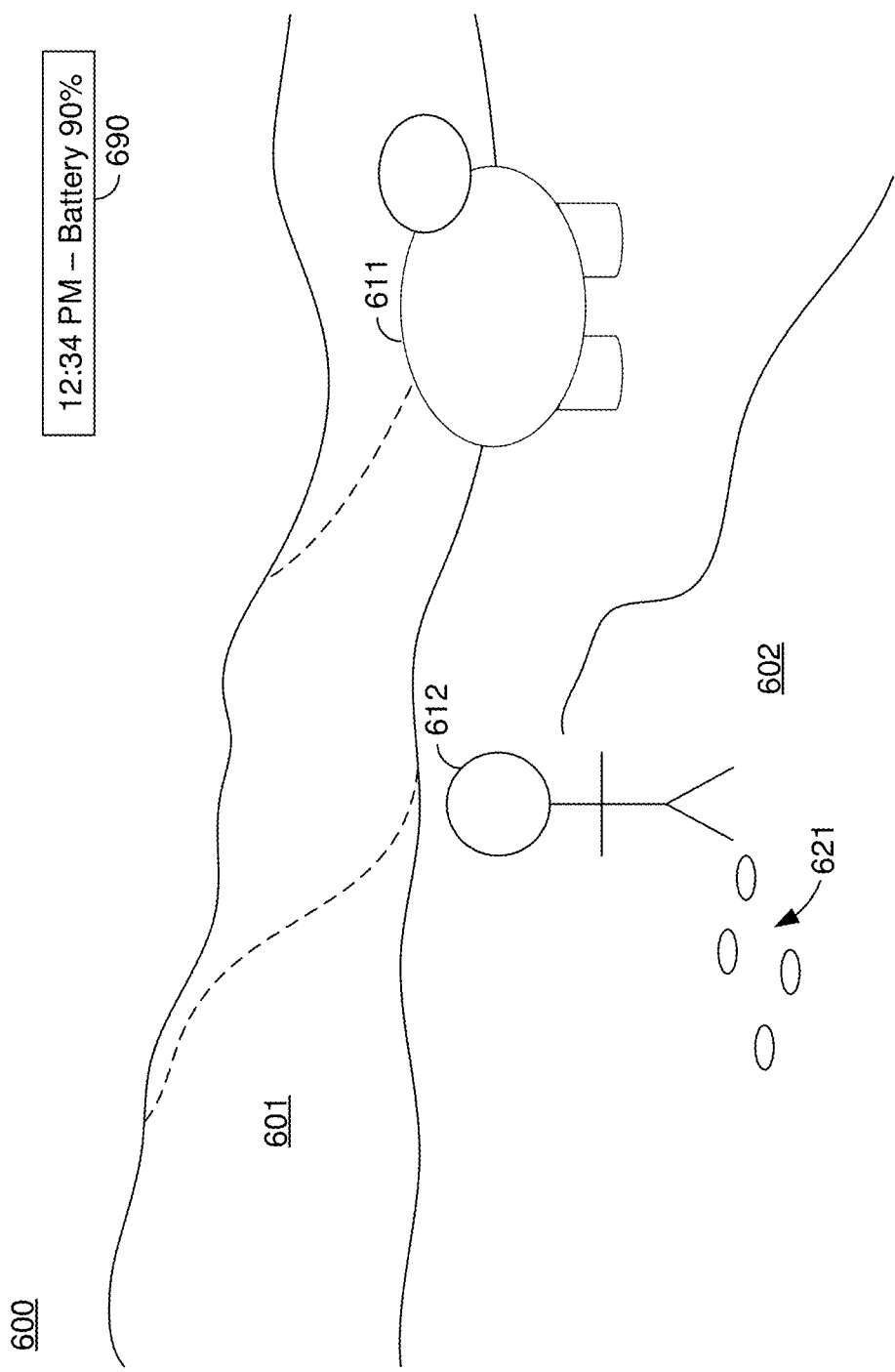
Figure 6C:
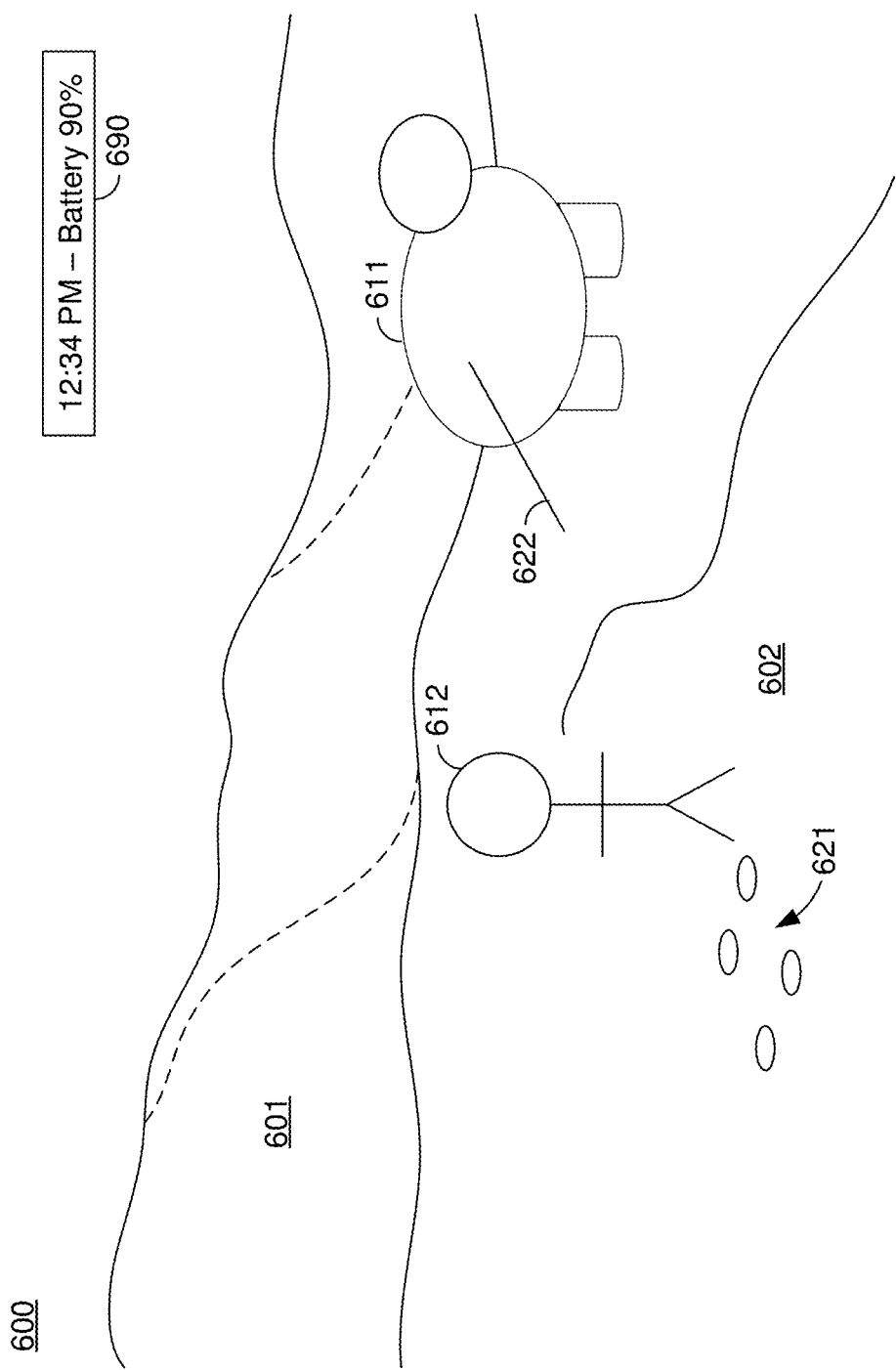

FIGS. 6A-6C illustrate a third XR environment 600 based on a third physical environment classified as a tundra environment. FIGS. 6A-6C illustrate the third XR environment 600 from the perspective of a user. FIGS. 6A-6C illustrate the third XR environment 600 during a series of time periods.

The third XR environment 600 includes a plurality of objects, including one or more real objects (e.g., a mountain 601 and snowy ground 602) and one or more virtual objects (e.g., a virtual mammoth 611, a virtual caveman 612, and a device status indicator 690). In various implementations, certain objects (such as the real objects 601 and 602, the virtual mammoth 611, and the virtual caveman 612) are displayed at a location in the third XR environment 600, e.g., at a location defined by three coordinates in a three-dimensional (3D) XR coordinate system. Accordingly, when the electronic device moves in the third XR environment 600 (e.g., changes position and/or orientation), the objects are moved on the display of the electronic device, but retain their location in the third XR environment 600. In various implementations, certain virtual objects (such as the device status indicator 690) are displayed at locations on the display such that when the electronic device moves in the third XR environment 600, the objects are stationary on the display of the electronic device. The device status indicator 690 displays information regarding the status of the electronic device, such as the time and/or battery remaining.

FIG. 6A illustrates the third XR environment 600 during a first time period. During the first time period, the electronic device, based at least in part on an image of the third physical environment, classifies the third physical environment as a tundra environment. In various implementations, the electronic device classifies the third physical environment by applying a neural network to the image of the third physical environment. In various implementations, the electronic device classifies the third physical environment based on detected objects in the third physical environment, such as the mountain 601 and/or the snowy ground 602.

In response to classifying the third physical environment as a tundra environment, the electronic device obtains content relevant to a tundra environment, including the virtual mammoth 611 and the virtual caveman 612.

In various implementations, the obtained content includes an objective-effectuator associated with various objectives that interacts with the third XR environment 600 to further those objectives. In various implementations, the objectives are based on the particular environment type. For example, in FIG. 6A, based on the third physical environment being classified as a tundra environment, the virtual caveman 612 is associated with an objective to move towards an animal and hunt the animal.

FIG. 6B illustrates the third XR environment 600 during a second time period subsequent to the first time period. During the second time period, the virtual caveman 612, in accordance with the objective to move towards an animal and hunt the animal, has moved with the third XR environment 600 towards the virtual mammoth 611.

In moving towards the virtual mammoth 611, the virtual caveman 612 has left virtual footprints 621 in the snowy ground 602. In various implementations, display of the virtual footprints 621 is based on the particular environment type. For example, virtual footprints 621 displayed in a tundra environment may look different than virtual footprints displayed in a coastal environment, such as the virtual footprints 421 in FIG. 4B.

FIG. 6C illustrates the third XR environment 600 during a third time period subsequent to the second time period. During the third time period, the virtual caveman 612, in accordance with the objective to move towards an animal and hunt the animal, has thrown a virtual spear 622 at the virtual mammoth 611.

Whereas FIGS. 4A-6C illustrate a virtual caveman in various XR environments as may be found in a national park, similar applications in which virtual content is presented based on an environment type may, for example, display a virtual settler in a colonial town, a virtual construction worker at the Empire state building, or a virtual immigrant at Ellis Island. Further applications may be associated with other tourist attractions, such as theme parks, zoos, or museums.

FIGS. 7A-8B illustrate various XR environments based on various physical environments. In various implementations, the various XR environments are displayed as part of an XR application executed by an electronic device. In various implementations, the various XR environments initially do not include a virtual chair, but, at a later time and in response to a user request to display a virtual chair, include a virtual chair. The various XR environments include different virtual chairs based on the environment types of the various physical environments.

Figure 7A:
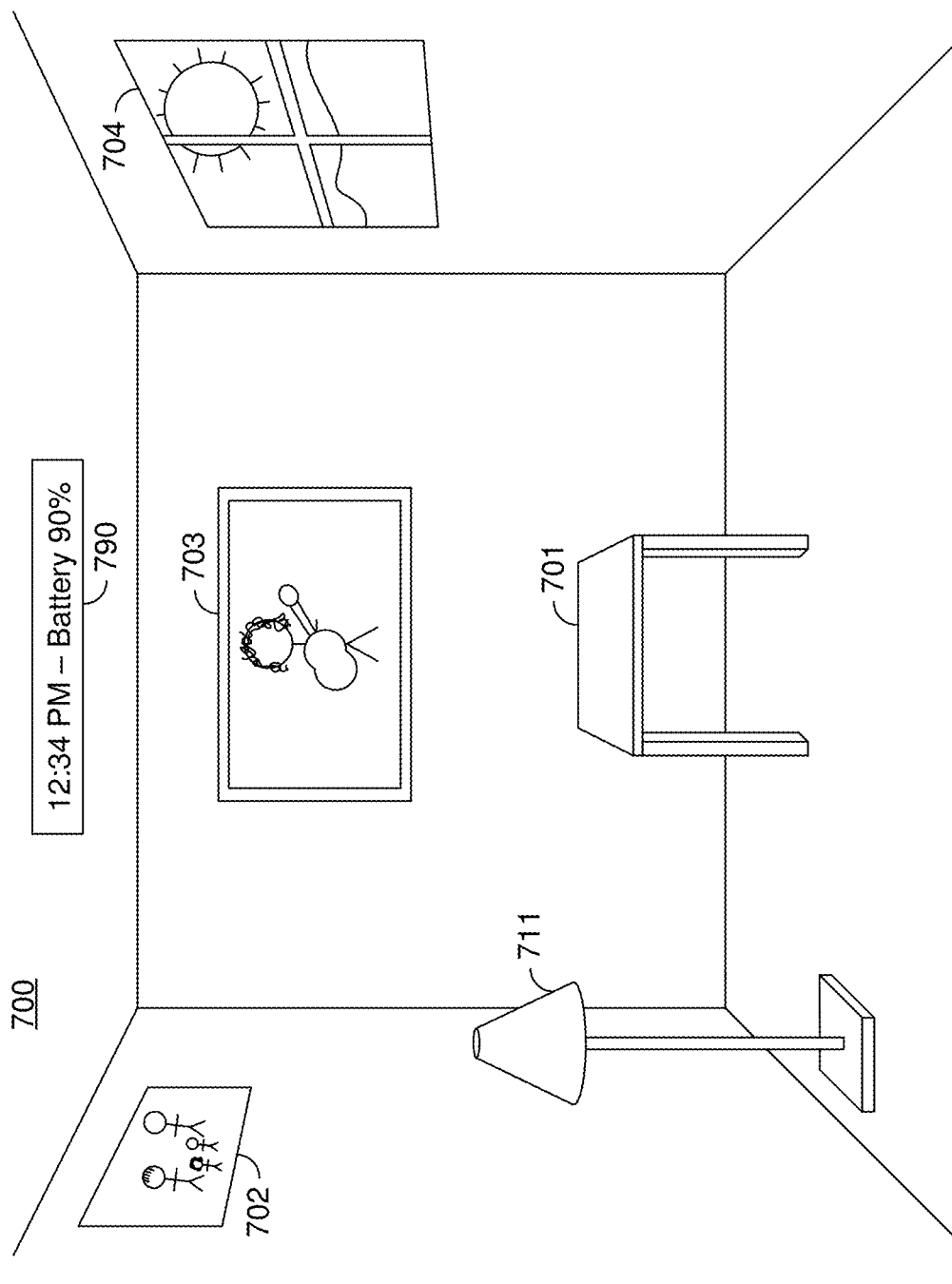
FIGS. 7A and 7B illustrate a fourth XR environment based on a physical environment classified as a home environment.
Figure 7B:
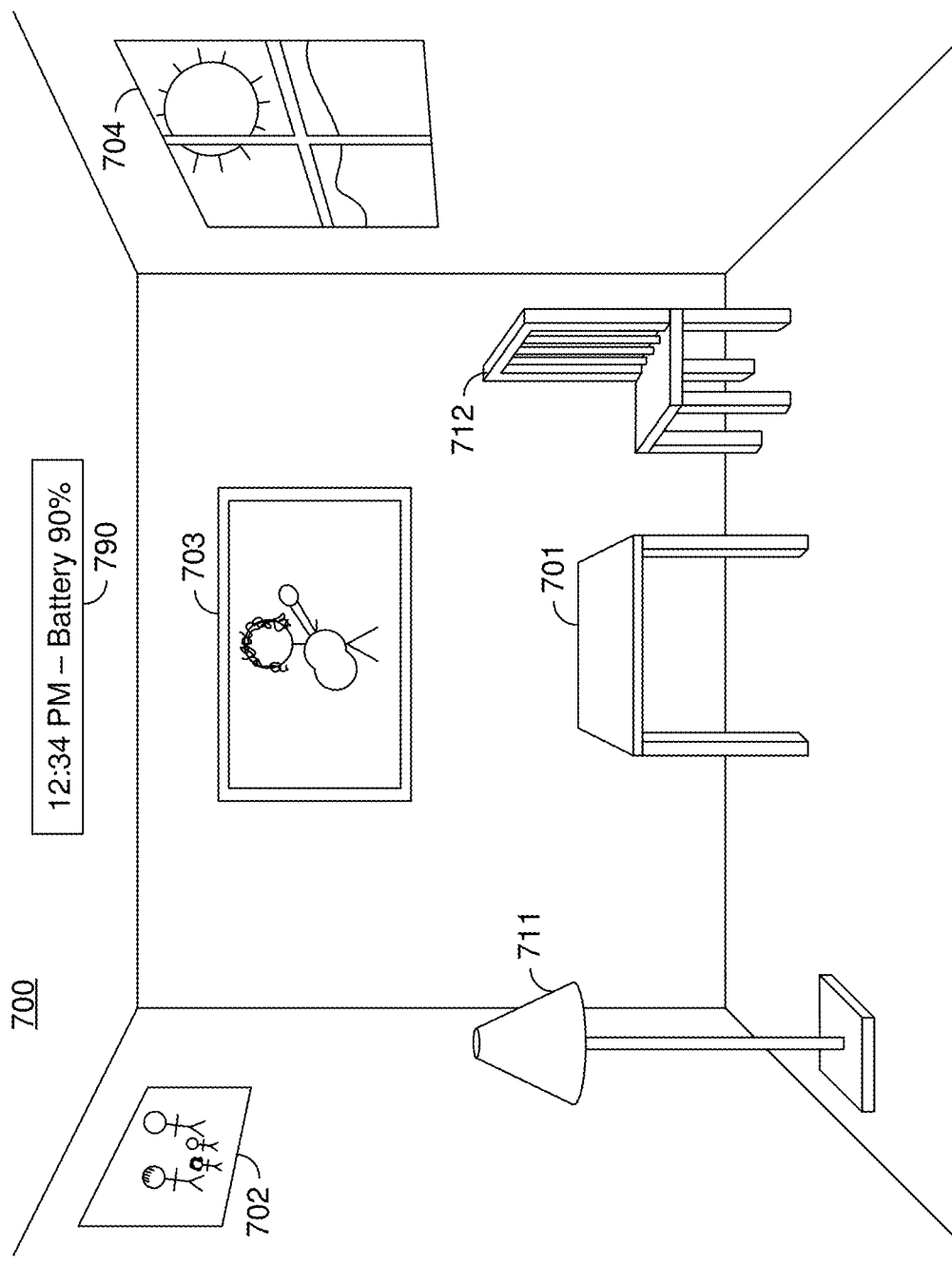

FIGS. 7A and 7B illustrate a fourth XR environment 700 based on a fourth physical environment classified as a home environment. FIGS. 7A and 7B illustrate the fourth XR environment 700 from the perspective of a user. FIGS. 7A and 7B illustrate the fourth XR environment 700 during a series of time periods.

The fourth XR environment 700 includes a plurality of objects, including one or more real objects (e.g., a table 701, a picture 702, a television 703, and a window 704) and one or more virtual objects (e.g., a virtual lamp 711 and a device status indicator 790). In various implementations, certain objects (such as the real objects 701-704 and the virtual lamp 711) are displayed at a location in the fourth XR environment 700, e.g., at a location defined by three coordinates in a three-dimensional (3D) XR coordinate system. Accordingly, when the electronic device moves in the fourth XR environment 700 (e.g., changes position and/or orientation), the objects are moved on the display of the electronic device, but retain their location in the fourth XR environment 700. In various implementations, certain virtual objects (such as the device status indicator 790) are displayed at locations on the display such that when the electronic device moves in the fourth XR environment 700, the objects are stationary on the display of the electronic device. The device status indicator 790 displays information regarding the status of the electronic device, such as the time and/or battery remaining.

FIG. 7A illustrates the fourth XR environment 700 during a first time period. During the first time period, the electronic device, based at least in part on an image of the fourth physical environment, classifies the fourth physical environment as a home environment. In various implementations, the electronic device classifies the fourth physical environment by applying a neural network to the image of the fourth physical environment. In various implementations, the electronic device classifies the fourth physical environment based on detected objects in the fourth physical environment, such as the table 701, the picture 702, the television 703, or the window 704. In various implementations, the electronic device classifies the fourth physical environment based on content being displayed on a screen of a real object, such as the television 703. For example, based on detecting the television 703, the electronic device could classify the fourth physical environment as a home environment or an office environment. However, based on also detecting that the television 703 is displaying a music channel, the electronic device classifies the fourth physical environment as a home environment.

FIG. 7B illustrates the fourth XR environment 700 during a second time period subsequent to the first time period. In response to a user request to display a virtual chair in the fourth XR environment 700, the fourth XR environment 700 includes a virtual wooden chair 712 during the second time period. In various implementations, the user request is a verbal request. In various implementations, the user request is an interaction with a virtual affordance.

In response to the user request to display a virtual chair in the fourth XR environment and based on classifying the fourth physical environment as a home environment, the electronic device selects, from a plurality of virtual chairs, a virtual chair associated with a home environment, e.g., the virtual wooden chair 712. Further, the electronic device displays the selected virtual chair, e.g., the virtual wooden chair 712.

Figure 8A:
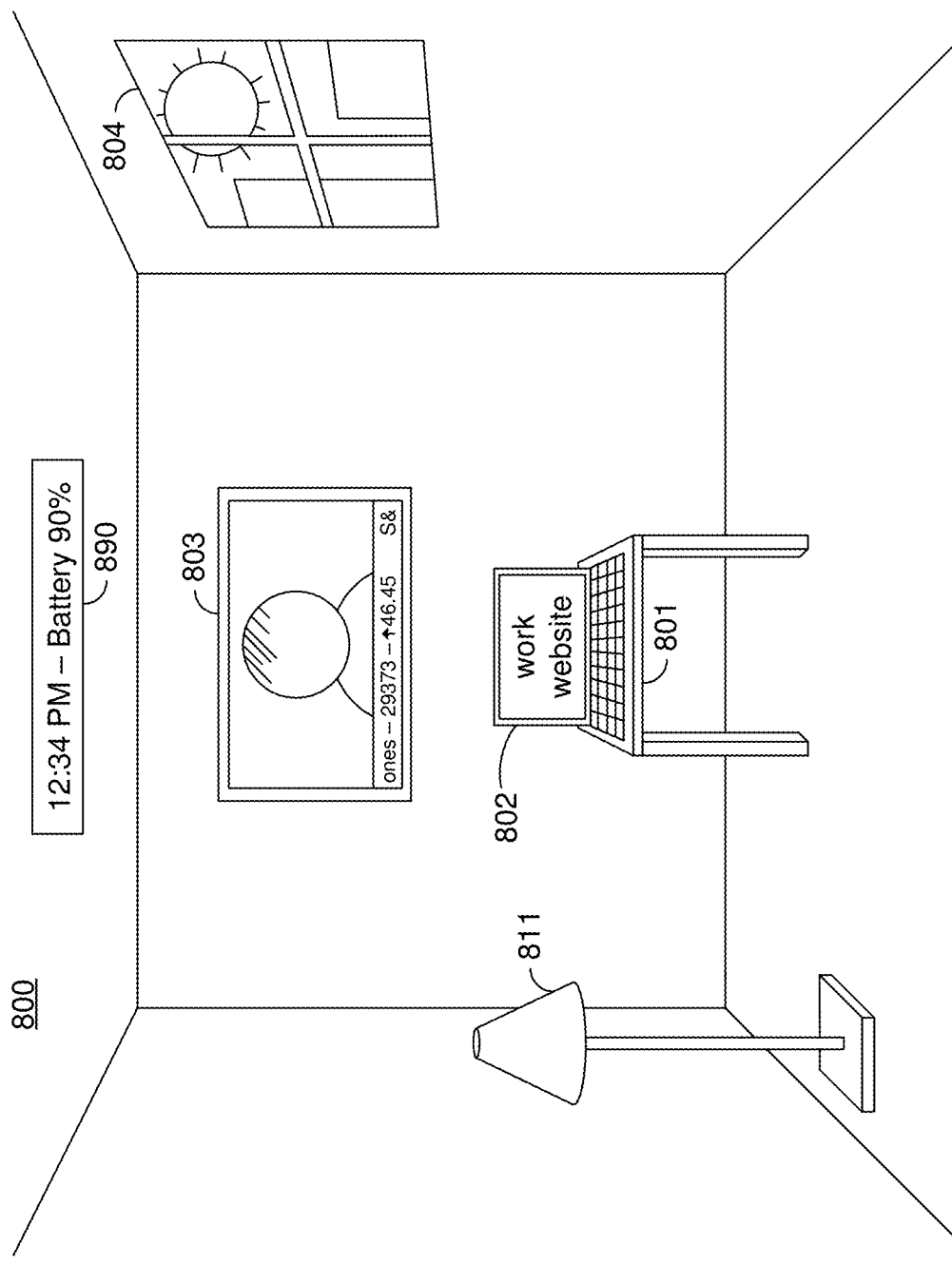
FIGS. 8A and 8B illustrate a fifth XR environment based on a physical environment classified as an office environment.
Figure 8B:
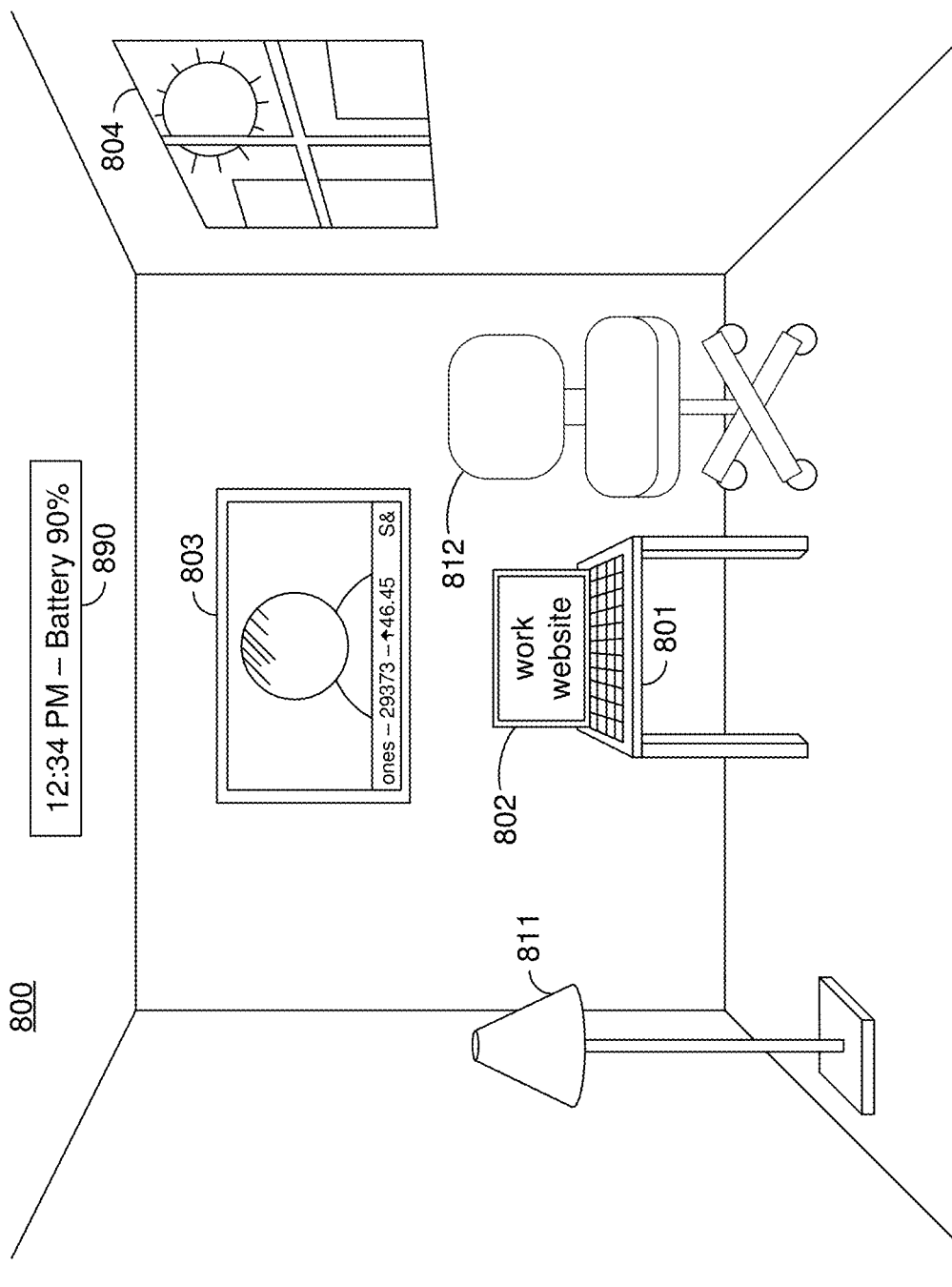

FIGS. 8A and 8B illustrate a fifth XR environment 800 based on a fifth physical environment classified as an office environment. FIGS. 8A and 8B illustrate the fifth XR environment 800 from the perspective of a user. FIGS. 8A and 8B illustrate the fifth XR environment 800 during a series of time periods.

The fifth XR environment 800 includes a plurality of objects, including one or more real objects (e.g., a table 801, a laptop 802, a television 803, and a window 804) and one or more virtual objects (e.g., a virtual lamp 811 and a device status indicator 890). In various implementations, certain objects (such as the real objects 801-804 and the virtual lamp 811) are displayed at a location in the fifth XR environment 800, e.g., at a location defined by three coordinates in a three-dimensional (3D) XR coordinate system. Accordingly, when the electronic device moves in the fifth XR environment 800 (e.g., changes position and/or orientation), the objects are moved on the display of the electronic device, but retain their location in the fifth XR environment 800. In various implementations, certain virtual objects (such as the device status indicator 890) are displayed at locations on the display such that when the electronic device moves in the fifth XR environment 800, the objects are stationary on the display of the electronic device. The device status indicator 890 displays information regarding the status of the electronic device, such as the time and/or battery remaining.

FIG. 8A illustrates the fifth XR environment 800 during a first time period. During the first time period, the electronic device, based at least in part on an image of the fifth physical environment, classifies the fifth physical environment as an office environment. In various implementations, the electronic device classifies the fifth physical environment by applying a neural network to the image of the fifth physical environment. In various implementations, the electronic device classifies the fifth physical environment based on detected objects in the fifth physical environment, such as the table 801, the laptop 802, the television 803, or the window 804. In various implementations, the electronic device classifies the fifth physical environment based on content being displayed on a screen of a real object, such as the television 803. For example, based on detecting the television 803, the electronic device could classify the fifth physical environment as a home environment or an office environment. However, based on also detecting that the television 803 is displaying a news channel, the electronic device classifies the fifth physical environment as an office environment. As another example, based on detecting the laptop 802, the electronic device could classify the fifth physical environment as a home environment or an office environment. However, based on also detecting that the laptop 802 is displaying a work website, the electronic device classifies the fifth physical environment as an office environment.

FIG. 8B illustrates the fifth XR environment 800 during a second time period subsequent to the first time period. In response to a user request to display a virtual chair in the fifth XR environment 800, the fifth XR environment 800 includes a virtual swivel chair 812 during the second time period. In various implementations, the user request is a verbal request. In various implementations, the user request is an interaction with a virtual affordance.

In response to the user request to display a virtual chair in the fifth XR environment 800 and based on classifying the fifth physical environment as an office environment, the electronic device selects, from a plurality of virtual chairs, a virtual chair associated with an office environment, e.g., the virtual swivel chair 812. Further, the electronic device displays the selected virtual chair, e.g., the virtual swivel chair 812.

Figure 9:
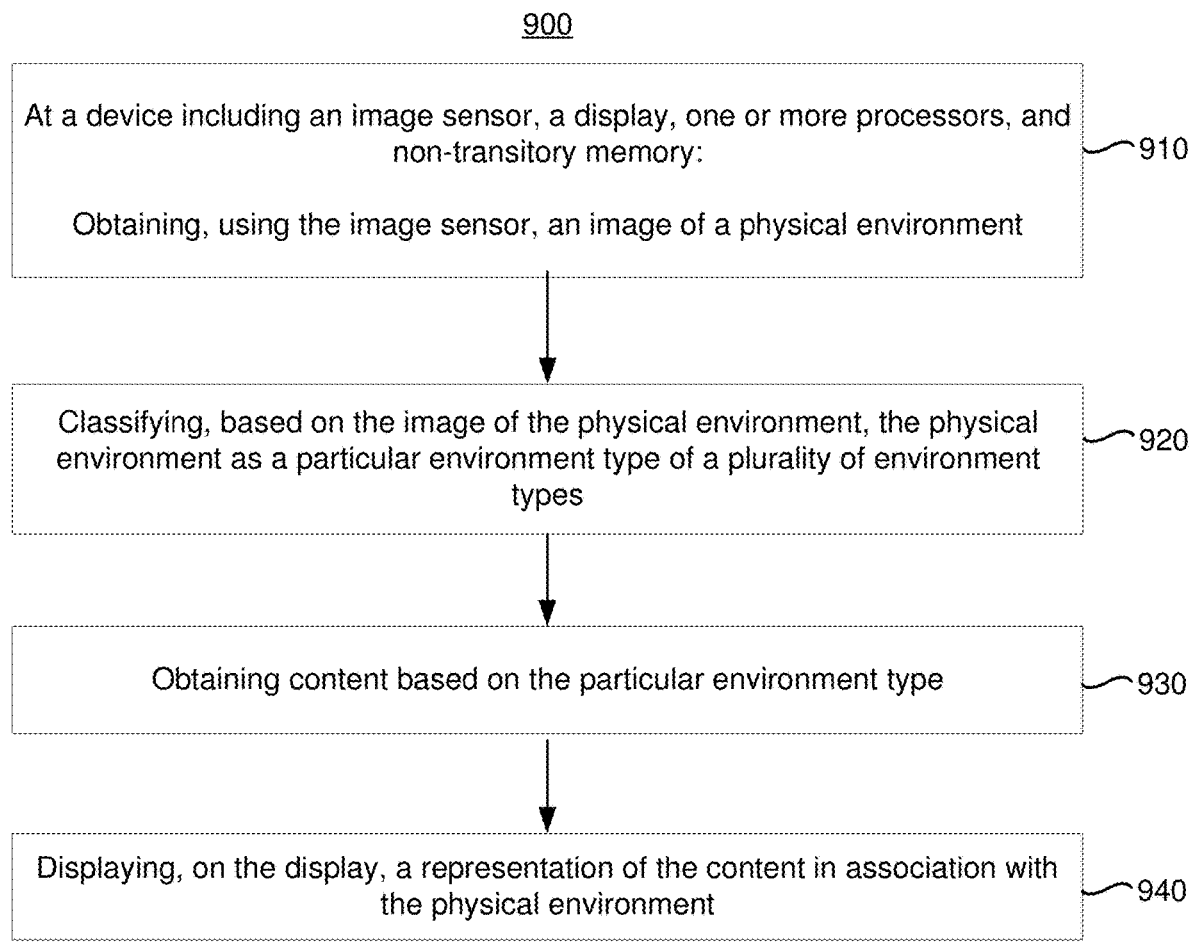
FIG. 9 is a flowchart representation of a method of presenting content in accordance with some implementations.

FIG. 9 is a flowchart representation of a method 900 of presenting content in accordance with some implementations. In various implementations, the method 900 is performed by a device with an image sensor, one or more processors, and non-transitory memory (e.g., the electronic device 120 of FIG. 3). In some implementations, the method 900 is performed by processing logic, including hardware, firmware, software, or a combination thereof. In some implementations, the method 900 is performed by a processor executing instructions (e.g., code) stored in a non-transitory computer-readable medium (e.g., a memory).

The method 900 begins, in block 910, with the device obtaining, using the image sensor, an image of a physical environment. For example, FIG. 5A illustrates the first XR environment 400 based on an image of a physical environment including the ocean 401, the palm tree 402, and the sandy ground 403.

The method 900 continues, in block 920, with the device classifying, based on the image of the physical environment, the physical environment as a particular environment type of a plurality of environment types. For example, in FIG. 4A, the electronic device classifies the first physical environment as a coastal environment.

In various implementations, classifying the physical environment includes applying a neural network to the image of the physical environment. For example, in various implementations, the device applies a neural network to the image of the physical environment to generate a label indicating the particular environment type.

In various implementations, the neural network includes an interconnected group of nodes. In various implementation, each node includes an artificial neuron that implements a mathematical function in which each input value is weighted according to a set of weights and the sum of the weighted inputs is passed through an activation function, typically a non-linear function such as a sigmoid, piecewise linear function, or step function, to produce an output value. In various implementations, the neural network is trained on training data to set the weights.

In various implementations, the neural network includes a deep learning neural network. Accordingly, in some implementations, the neural network includes a plurality of layers (of nodes) between an input layer (of nodes) and an output layer (of nodes). In various implementations, the neural network receives, as inputs, the image of the physical environment. In various implementations, the neural network provides, as an output, a label indicating the particular environment type.

In various implementations, the neural network is trained for a variety of environment types. For each environment type, training data in the form of image data representing the environment type is provided. Thus, the neural network is trained with many different images of forest environments to train the neural network to classify a physical environment as a forest environment. Similarly, the neural network is trained with many different images of office environments to train the neural network to classify a physical environment as an office environment.

In various implementations, the neural network includes a plurality of neural network detectors, each trained for a different environment. Each neural network detector, trained on images of the environment type, provides, as an output, a probability that an image represents a physical environment of the particular environment type. Thus, in response to receiving an image, a neural network detector for a coastal environment may output a probability of 0.2 and a neural network detector for a tundra detector may output a probability of 0.9. The label for the particular environment type is determined based on the greatest output breaching a threshold.

In various implementations, classifying the physical environment is based on detecting one or more objects in the image of the physical environment. For example, in FIG. 4A, the electronic device classifies the first physical environment as a coastal environment based on detecting the ocean 401. In various implementations, classifying the physical environment is based on detecting a plurality of objects in the image of the physical environment. For example, in FIG. 5A, the electronic device classifies the second physical environment as a forest environment based on detecting the plurality of trees 501A-501C. As another example, the electronic device classifies the third physical environment as a tundra environment based on detecting the mountain 601 and the snowy ground 602.

In various implementations, classifying the physical environment is based on content displayed on a screen in the physical environment. For example, in FIG. 7A, the electronic device classifies the fourth physical environment as a home environment based on the music channel being displayed by the television 703. As another example, in FIG. 8A, the electronic device classifies the fifth physical environment as an office environment based on the work website being displayed by the laptop 802.

In various implementations, classifying the physical environment is based on a point cloud of the physical environment. For example, in various implementations, the electronic device narrows the particular environment type to a subset of the plurality of environment types based on the point cloud indicating that the electronic device is inside or outside or within a large room or a small room.

In various implementations, classifying the physical environment is based on a physical location of the physical environment. For example, in various implementations, the electronic device narrows the particular environment type to a subset of the plurality of environment types based on the physical location being within a particular region, such as a particular city, national park, or state.

In various implementations, classifying the physical environment is based on an environmental condition of the physical environment. Environmental conditions include, for example, temperature, humidity, air quality, and weather conditions. For example, in FIG. 4A, the electronic device detects the sandy ground 403 and determines that the first physical environment is either a coastal environment or a desert environment. In response to determining that the temperature is a moderate temperature (rather than a high temperature), the electronic device determines that the first physical environment is a coastal environment.

In various implementations, classifying the physical environment is based on a lighting characteristic of the physical environment. For example, an electronic device may classify a first physical environment as a home environment based on detecting warm lighting and classify a second physical environment as an office environment based on detecting cool lighting.

In various implementations, classifying the physical environment is based on a time at the physical environment. In various implementations, the time at the physical environment is a time of day, a day of the week, or a time of year.

For example, in FIG. 6A, the electronic device classifies the third physical environment as a tundra environment in response to detecting the snowy ground 602 in the middle of summer. As another example, in FIG. 7A, the electronic device classifies the fourth physical environment as a home environment in response to detecting the picture 702 and the window 704 on a Sunday, whereas it may be more likely to classify the fourth physical environment as an office environment were it a weekday.

In various implementations, the plurality of environment types includes a plurality of biomes. For example, FIGS. 4A, 5A, and 6A illustrate three biomes: a coastal environment, a forest environment, and a tundra environment. Other biomes include desert, chaparral, littoral, rainforest, taiga, grasslands, etc.

In various implementations, the plurality of environment types includes at least at least one of a home environment, a work environment, a school environment, or a commercial environment. For example, FIGS. 7A and 8A illustrate a home environment and a work environment.

The method 900 continues, in block 930, with the electronic device obtaining content based on the particular environment type. For example, in FIG. 4A, in response to classifying the first physical environment as a coastal environment, the electronic device obtains content relating to a virtual bug 411 and a virtual caveman 412 with particular objectives.

In various implementations, obtaining the content includes selecting the content from a plurality of content items respectively associated with the plurality of environment types. For example, from a plurality of virtual chairs respectively associated with a plurality of environment times, the electronic device, in FIG. 7B, selects the virtual wooden chair 712 based on classifying the fourth physical environment as a home environment and, in FIG. 8B, selects the virtual swivel chair 812 based on classifying the fifth physical environment as an office environment.

In various implementations, obtaining the content is performed in response to a user request for content. For example, in FIG. 7B, the electronic device displays the virtual wooden chair 712 in response to a user request to display a virtual chair.

In various implementations, obtaining the content includes obtaining audio content based on the particular environment type, the method further comprising playing, via a speaker, the audio content. For example, in FIG. 4B, the electronic device obtains audio content of walking on sand based on classifying the first physical environment as a coastal environment. As another example, in FIG. 5B, the electronic device obtains audio content of walking on leaves based on classifying the second physical environment as a forest environment.

In various implementations, the audio content based on the particular environment type is played in response to a virtual object moving through the physical environment. In various implementations, the audio content based on the particular environment type is played in response to a user moving through the physical environment. Thus, whereas FIGS. 4A-4C illustrates an example of obtaining audio content of walking on sand that is played with each footstep of the virtual caveman 412, in various implementations, audio content of walking on sand (obtained based on the particular environment type) is played with each footstep of the user.

In various implementations, obtaining the content includes obtaining an objective-effectuator based on the particular environment type. For example, in FIG. 4A, in response to classifying the first physical environment as a coastal environment, the electronic device obtains content relating to the virtual caveman 412 with the objective to catch fish. In FIG. 6A, in response to classifying the third physical environment as a tundra environment, the electronic device obtains content relating to the virtual caveman 612 with the objective to hunt an animal.

In various implementations, to further an objective, an objective-effectuator interacts with a real object in the XR environment. For example, in FIG. 5C, the virtual caveman 512 interacts with the second tree 501B. In various implementations, to further an objective, an objective-effectuator interacts with a virtual object in the XR environment. For example, in FIG. 6C, the virtual caveman 612 interacts with the virtual mammoth 611.

The method 900 continues, in block 940, with the device displaying, on the display, a representation of the content in association with the physical environment. For example, in FIG. 4A, the electronic device displays the virtual bug 411 and the virtual caveman 412 in association with the first physical environment.

In various implementations, the display is an opaque display and the representation of the content is displayed in association with the physical environment as a composite image of the representation of the content and an image of the physical environment. Thus, in various implementations, displaying the representation of the content includes displaying, based on the image of the physical environment, an image representation of the physical environment including the representation of the content. In various implementations, the display is a transparent display and the representation of the content is displayed in association with the physical environment as a projection over a view of the physical environment.

In various implementations, classifying the physical environment (in block 920) is based on detecting a particular object in the image of the physical environment. In various implementations, displaying the representation of the content in association with the physical environment includes displaying the representation of the content in association with the particular object. For example, in FIG. 4A, the first physical environment is classified as a coastal environment based on detecting the palm tree 402 and the virtual bug 411 is displayed on the palm tree 402. As another example, in FIG. 5A, the second physical environment is classified as a forest environment based on detecting the first tree 501A and the virtual squirrel 511 is displayed in the first tree 501A.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
    at a device including an image sensor, a display, a processor, and non-transitory memory:
    obtaining, using the image sensor, an image of a physical environment;
    classifying, based on the image of the physical environment, the physical environment as a particular environment type of a plurality of environment types;
    obtaining a request to display a virtual object in association with the physical environment;
    obtaining a first type of the virtual object from a plurality of types of the virtual object, wherein the first type of virtual object represents a first physical object, and wherein the first type of the virtual object is associated with a first environment type;
    selecting, by the electronic device, the first type of the virtual object based on classifying the physical environment as the first environment type;
    obtaining a first objective-effectuator associated with at least one objective based on the particular environment type being the first environment type;
    causing the first objective-effectuator to perform a task associated with the at least one objective; and
    displaying, on the display, a representation of the first type of the virtual object in association with the physical environment.

2. The method of claim 1, wherein classifying the physical environment includes applying a neural network to the image of the physical environment.

3. The method of claim 1, wherein classifying the physical environment is based on detecting a particular object in the image of the physical environment.

4. The method of claim 3, wherein displaying the representation of the first type of the virtual object includes displaying the representation of the first type of the virtual object in association with the particular object.

5. The method of claim 1, wherein classifying the physical environment is based on content displayed on a screen in the physical environment.

6. The method of claim 1, wherein classifying the physical environment is based on at least one of a point cloud of the physical environment, a physical location of the physical environment, an environmental condition of the physical environment, a lighting characteristic of the physical environment, or a time at the physical environment.

7. The method of claim 1, wherein the plurality of environment types includes a plurality of biomes.

8. The method of claim 1, wherein the plurality of environment types includes at least one of a home environment, a work environment, a school environment, or a commercial environment.

9. The method of claim 1, wherein obtaining the first type of the virtual object includes selecting the first type of the virtual object from a plurality of types of the virtual object respectively associated with the plurality of environment types.

10. The method of claim 1, wherein obtaining the first type of the virtual object includes obtaining audio content based on the first environment type, the method further comprising playing, via a speaker, the audio content.

11. The method of claim 1, wherein the first type of the virtual object is made from a first set of components, and wherein the first set of components corresponds to a first set of materials.

12. The method of claim 1, wherein the first type of the virtual object has a first visual appearance indicative of the first set of components.

13. The method of claim 1, wherein the first virtual object is moveable in a first manner associated with the first set of components.

14. The method of claim 1, wherein the task associated with the at least one objective includes an interaction with a real object in the physical environment.

15. The method of claim 1, wherein the task associated with the at least one objective includes an interaction with a virtual object in the physical environment.

16. A device comprising:
    an image sensor;
    a display;
    a non-transitory memory; and
    one or more processors to:
    obtain, using the image sensor, an image of a physical environment;
    classify, based on the image of the physical environment, the physical environment as a particular environment type of a plurality of environment types;
    obtain a request to display a virtual object in association with the physical environment;
    obtain a first type of the virtual object from a plurality of types of the virtual object, wherein the first type of virtual object represents a first physical object, and wherein the first type of the virtual object is associated with a first environment type;
    select, by the electronic device, the first type of the virtual object based on classifying the physical environment as the first environment type;

obtain a first objective-effectuator associated with at least one objective based on the particular environment type being a first environment type;
cause the first objective-effectuator to perform a task associated with the at least one objective; and
display, on the display, a representation of the first type of the virtual object in association with the physical environment.

17. The device of claim 16, wherein the one or more processors are to classify the physical environment by applying a neural network to the image of the physical environment.

18. The device of claim 16, wherein the one or more processors are to classify the physical environment based on at least one of a point cloud of the physical environment, a physical location of the physical environment, an environmental condition of the physical environment, a lighting characteristic of the physical environment, or a time at the physical environment.

19. The device of claim 16, wherein the one or more processors are to obtain the first type of the virtual object by selecting the first type of the virtual object from a plurality of types of the virtual object respectively associated with the plurality of environment types.

20. The device of claim 16, wherein the one or more processors are to obtain the first type of the virtual object by obtaining audio content based on the first environment type and are further to play, via a speaker, the audio content.

21. The device of claim 16, wherein classifying the physical environment includes applying a neural network to the image of the physical environment.

22. A non-transitory memory storing one or more programs,
which, when executed by one or more processors of a device with an image sensor and
a display, cause the device to:
obtain, using the image sensor, an image of a physical environment;
classify, based on the image of the physical environment, the physical environment as a particular environment type of a plurality of environment types;
obtain a request to display a virtual object in association with the physical environment;
obtain a first type of the virtual object from a plurality of types of the virtual object, wherein the first type of virtual object represents a first physical object, and wherein the first type of the virtual object is associated with a first environment type;
select, by the electronic device, the first type of the virtual object based on classifying the physical environment as the first environment type;
obtain a first objective-effectuator associated with at least one objective based on the particular environment type being a first environment type;
cause the first objective-effectuator to perform a task associated with the at least one objective; and
display, on the display, a representation of the first type of the virtual object in association with the physical environment.

23. The non-transitory memory of claim 22, wherein classifying the physical environment includes applying a neural network to the image of the physical environment.

24. The non-transitory memory of claim 22, wherein classifying the physical environment is based on at least one of a point cloud of the physical environment, a physical location of the physical environment, an environmental condition of the physical environment, a lighting characteristic of the physical environment, or a time at the physical environment.

25. The non-transitory memory of claim 22, wherein obtaining the first type of the virtual object includes obtaining audio content based on the first environment type, the one or more processors further cause the device to, play, via a speaker, the audio content.

* * * * *